United States Patent
Roscoe et al.

(10) Patent No.: US 10,145,979 B2
(45) Date of Patent: Dec. 4, 2018

(54) GAMMA-RAY DETECTORS FOR DOWNHOLE APPLICATIONS

(71) Applicant: Schlumberger Technology Corporation, Sugar Land, TX (US)

(72) Inventors: Bradley Albert Roscoe, West Chesterfield, NH (US); James A. Grau, Marshfield, MA (US); Zilu Zhou, Needham, MA (US); Kenneth E. Stephenson, New Castle, VA (US); Markus Berheide, Medford, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/454,458

(22) Filed: Mar. 9, 2017

(65) Prior Publication Data
US 2017/0184759 A1 Jun. 29, 2017

Related U.S. Application Data

(63) Continuation of application No. 14/553,611, filed on Nov. 25, 2014, now Pat. No. 9,599,729, which is a
(Continued)

(51) Int. Cl.
G01V 5/08 (2006.01)
G01V 5/12 (2006.01)
(Continued)

(52) U.S. Cl.
CPC .............. *G01V 5/125* (2013.01); *G01T 1/20* (2013.01); *G01T 1/208* (2013.01); *G01V 5/08* (2013.01);
(Continued)

(58) Field of Classification Search
CPC . G01V 5/05; G01V 5/14; G01V 5/125; G01V 5/08; G01V 5/101; G01V 5/105;
(Continued)

(56) References Cited

U.S. PATENT DOCUMENTS

| 4,503,328 A | 3/1985 | Neufeld |
| 4,839,090 A | 6/1989 | Rosette et al. |

(Continued)

FOREIGN PATENT DOCUMENTS

EP 1816241 A1 8/2007

OTHER PUBLICATIONS

Kernan, et al., "Self-Activity in Lanthanum Halides", IEEE Nuclear Science Symposium Conference Record, vol. 2, 2004, pp. 1002-1005.
(Continued)

*Primary Examiner* — David Porta
*Assistant Examiner* — Faye Boosalis
(74) *Attorney, Agent, or Firm* — Michael Dae

(57) ABSTRACT

Methods and related systems are described for gamma-ray detection. A gamma-ray detector is made depending on its properties and how those properties are affected by the data analysis. Desirable properties for a downhole detector include; high temperature operation, reliable/robust packaging, good resolution, high countrate capability, high density, high Z, low radioactive background, low neutron cross-section, high light output, single decay time, efficiency, linearity, size availability, etc. Since no single detector has the optimum of all these properties, a downhole tool design preferably picks the best combination of these in existing detectors, which will optimize the performance of the measurement in the required environment and live with the remaining non-optimum properties. A preferable detector choice is one where the required measurement precision
(Continued)

(logging speed) is obtained for all of the required inelastic elements and/or minimization of unwanted background signals that complicate the data analysis.

20 Claims, 21 Drawing Sheets

Related U.S. Application Data continuation of application No. 13/852,965, filed on Mar. 28, 2013, now Pat. No. 8,901,483, which is a continuation of application No. 12/783,207, filed on May 19, 2010, now Pat. No. 8,431,885.

(60) Provisional application No. 61/180,728, filed on May 22, 2009.

(51) Int. Cl.
   G01V 5/10      (2006.01)
   G01T 1/20      (2006.01)
   G01T 1/208     (2006.01)

(52) U.S. Cl.
   CPC .............. G01V 5/101 (2013.01); G01V 5/102 (2013.01); G01V 5/105 (2013.01)

(58) Field of Classification Search
   CPC ........ G01V 5/102; G01N 23/06; G01T 1/208; G01T 1/20
   See application file for complete search history.

(56) References Cited

U.S. PATENT DOCUMENTS

| | | |
|---|---|---|
| 4,937,446 A | 6/1990 | McKeon et al. |
| 5,025,151 A | 6/1991 | Melcher |
| 5,318,722 A | 6/1994 | Tsoukala et al. |
| 5,360,557 A | 11/1994 | Tsoukala et al. |
| 5,391,876 A | 2/1995 | Tsoukala et al. |
| 5,608,215 A | 3/1997 | Evans |
| 5,804,820 A | 9/1998 | Evans et al. |
| 6,246,744 B1 | 6/2001 | Duclos et al. |
| 6,278,832 B1 | 8/2001 | Zagumennyi et al. |
| 6,358,441 B2 | 3/2002 | Duclos et al. |
| 7,019,284 B2 | 3/2006 | Srivastava et al. |
| 7,067,815 B2 | 6/2006 | Dorenbos et al. |
| 7,067,816 B2 | 6/2006 | Dorenbos et al. |
| 7,084,403 B2 | 8/2006 | Srivastava et al. |
| 7,233,006 B2 | 6/2007 | Dorenbos et al. |
| 7,250,609 B2 | 7/2007 | Dorenbos et al. |
| 7,365,307 B2 | 4/2008 | Stoller et al. |
| 7,405,404 B1 | 7/2008 | Shah |
| 7,479,637 B2 | 1/2009 | Dorenbos et al. |
| 7,767,971 B2 | 8/2010 | Van Eijk et al. |
| 7,960,687 B1 | 6/2011 | Simon et al. |
| 7,999,220 B2 | 8/2011 | Odom |
| 8,039,792 B2 | 10/2011 | Nikitin et al. |
| 8,742,328 B2 | 6/2014 | Simon et al. |
| 2003/0076914 A1 | 4/2003 | Tiller et al. |
| 2008/0001087 A1 | 1/2008 | Srivastava et al. |
| 2010/0314536 A1 | 12/2010 | Molz et al. |
| 2010/0327153 A1 | 12/2010 | Molz |
| 2012/0197529 A1 | 8/2012 | Stephenson et al. |

OTHER PUBLICATIONS

Walker, et al., "Chart of the Nuclides", General Electric, 1977, pp. 1-26.

Odom, et al., "Experiments on Closely Spaced Detector Candidates for Carbon/Oxygen Logging", Petrophysics, vol. 46 (3), pp. 1-11, 2005.

Odom, et al., "Experiments on Closely Spaced Detector Candidates for Carbon/Oxygen Logging", SPWLA 45th Annual Logging Symposium, Jun. 2004, pp. 1-14.

Roscoe, et al., "A New Through-Tubing Oil-Saturation Measurement System", SPE 21413—Middle East Oil Show, Bahrain, Nov. 16-19, 1991, pp. 1-10.

Roscoe, et al., "Response of the Carbon/Oxygen Measurement for an Inelastic Gamma Ray Spectroscopy Tool", SPE 14460, 1985, pp. 1-7.

Dorenbos "The 5d level positions of the trivalent lanthanides in inorganic compounds," Journal of Luminescence, 91, (2000), pp. 155-176.

Dorenbos et al. "Scintillation Properties of Pr3+ Doped Lu3Al5—xScxO12 Crystals," Proc. Int. Conf. on Inorganic Scintillators and Their Applications, SCINT95, 1996, The Netherlands, pp. 365-367.

Dujardin, et al. "Luminescence properties and scintillation mechanisms of cerium- and praseodymium-doped lutetium orthoaluminate," J. Phys.: Condens. Matter 9, (1997), pp. 5229-5243.

Gumanskaya, et al. "Interconfiguration luminescence of Pr3+ ions in Y3Al5O12 and YAlO3 single crystals," Opt. Spectrosc. (USSR), 72, Jan. 1, 1992, pp. 86-88.

Kucera et al. "Growth and emission properties of Sc, Pr, and Ce co-doped Lu3Al5O12 epitaxial layers for scintillators," Journal of Crystal Growth, 318, (2011), pp. 813-819.

Kuwano, et al. "Crystal growth and properties of (Lu,Y)3Al5O12," Journal of Crystal Growth, 260, (2004), pp. 159-165.

Lempicki et al. "LuAlO3:Ce and Other Aluminate Scintillators," IEEE Transactions on Nuclear Science, vol. 24, No. 4, Aug. 1995, pp. 280-284.

Mateika, et al. "Lattice-Constant-Adaptable Crystallographics, II. Czochralski growth from multicomponent melts of homogeneous mixed-garnet crystals," Journal of Crystal Growth, 102, (1990), pp. 994-1013.

Moszynski et al. "Properties of the YAG: Ce scintillator," Nuclear Instruments and Methods in Physics Research, Section A, 345, (1994), pp. 461-467.

Nikl, et al. "Traps and Timing Characteristics of LuAG:Ce3+," Phys. Stat. Sol. (a), 181, (2000), Rapid Research Notes, pp. R10-R13.

Pawlak, et al. "Spectroscopic and crystallographic studies of YAG:Pr4+ single crystals," Journal of Alloys and Compounds, 275-277, (1998), pp. 361-364.

Rodnyi, et al. "Luminescence of Trivalent Praseodymium in Oxides and Fluorides," Optics and Spectroscopy, vol. 93, No. 5, 2002, pp. 714-721.

Ryskin, et al. "Scintillation properties of Lu3Al5—xScxO12 crystals," J. Phys.: Condens. Matter 6, (1994), pp. 10423-10434.

Shulgin "Fast Inorganic Scintillators," Proc. Int. Sump. Luminescent Detectors and Transformers of ionizing Radiation, (Lumdetr'91), Oct. 9-12, 1991, Riga, Latvia, A3, 2 pages.

Thiel, et al. "Systematics of 4f electron energies relative to host bands by resonant photoemission of rare-earth ions in aluminum garnets," Physical Review B, vol. 64, (2001), pp. 085107-1-085107-13.

van Eijk, et al. "Nd3+ and Pr3+ Doped Inorganic Scintillators," IEEE Transactions on Nuclear Science, vol. 41, No. 4, Aug. 1994, pp. 738-741.

van Pieterson, et al. "4fn↔4fn-1 5d transitions of the trivalent lanthanides: experiment and theory," Journal of Luminescence, 94-95, (2001), pp. 79-83.

Weber "Nonradiative Decay from 5d States of Rare Earth in Crystals," Solid State Communications, vol. 21, pp. 741-744, 1973.

Zorenko, et al. "New scintillation detectors based on oxide single crystal films for biological microtomography," Nuclear Instruments and Methods in Physics Research, Section A, 505, (2003), pp. 93-96.

GAMMA-RAY DETECTORS FOR DOWNHOLE APPLICATIONS

BACKGROUND

1. Field

This patent specification relates generally to oilfield logging. More particularly, this patent specification relates to methods and systems for detecting gamma-rays in downhole applications.

2. Background

Many properties of a subterranean formation may be determined using different oilfield logging techniques, which may involve one or more tools having a radioisotope source. For example, to locate gas in a subterranean formation, a conventional practice combines data obtained from two tools. One of the tools is a "density" tool, which measures the electron density of the formation, and the other of the tools is a "neutron porosity" tool, which generally measures the density of hydrogen in the formation, known as the "hydrogen index" (HI). Based on measurements of formation density and hydrogen index, the porosity and pore fluid density of the formation may be determined. For a given formation fluid density, or gas saturation, a combination of a decrease in the formation density and an increase in the hydrogen index indicates an increase in the porosity of the formation. Meanwhile, for a given formation porosity, a combination of a decrease in the formation density and a decrease in hydrogen index indicates a decrease in the pore fluid density and hydrogen content. For pores filled with water and gas or oil and gas, the density and hydrogen index are an indication of the gas saturation (volume fraction of the pores occupied by gas). For pores filled with gas only, the density and hydrogen index are an indication of gas density (pressure).

The density and neutron porosity tools for measuring formation density and hydrogen index may generally employ radioactive sources to obtain formation density and hydrogen index measurements, respectively. For example, the density tool may use a source such as $^{137}$Cs to emit gamma-rays into a formation. Based on a count of gamma-rays scattered by the formation, the density tool may determine the electron density of the formation. Similarly, the neutron porosity tool may use a source such as $^{241}$Am—Be to emit neutrons into a formation. A count of neutrons scattered by the formation may yield a hydrogen index measurement. Such radioisotope sources may be disadvantageous in oilfield tools, as the sources may be heavily regulated by law and their output may diminish over time.

In lieu of such radioisotope sources, an electronic neutron generator may produce both neutrons and gamma-rays. To do so, the electronic neutron generator may emit neutrons into a formation, which may in turn produce gamma-rays via inelastic scattering and neutron capture events. A count of gamma-rays produced by inelastic scattering may generally yield a signal that corresponds to formation density, and a count of scattered neutrons may generally yield a neutron porosity signal that corresponds to the hydrogen index of the formation. However, a count of gamma-rays produced by neutron capture may also yield a signal corresponding to the hydrogen index of the formation. Thus, as a count of gamma-rays produced by neutron capture events may overwhelm a count of gamma-rays produced by inelastic scattering, simply counting all scattered gamma-rays may yield a signal that corresponds, at least in part, to the hydrogen index of the formation. Since such gamma-ray and neutron counts are not independent, the two signals may not enable determination of porosity and gas saturation. Other oilfield logging techniques may involve spectral analyses of both the inelastic and capture gamma-rays produced by neutrons emitted into a formation. As noted above, it may be possible for detected inelastic gamma-rays to be overwhelmed by detected neutron capture gamma-rays.

The selection of an optimum detector type for, capture spectroscopy, inelastic measurements, and density measurement has been an issue requiring many trade-offs. The trade-offs that must be considered include not only the hardware, but how the collected data is processed.

A property that is usually ignored for the inelastic measurement is the affinity the detector has for interacting with neutrons of various energies, including thermal, epithermal, and fast and the production and detection of associated particles resulting from these interactions. For some previous and existing inelastic measurement tools, the number of detected events from these neutron reactions can be over 60% of the total detected counts. This results in a huge unwanted background signal that significantly degrades the performance of the desired signal, since the unwanted signal must be removed in some way. The degradation in performance can be due to reduced precision (logging speed) or complicating the interpretation of the physics of the measurements such that petrophysical usage is limited.

Paper "Response of the Carbon/Oxygen Measurement for an Inelastic Gamma Ray Spectroscopy Tool, B. A. Roscoe and J. A. Grau, SPE 14460, *SPE Formation Evaluation, March* (1988) 76-80 and A New Through-Tubing Oil-Saturation Measurement System", B. A. Roscoe, C. Stoller, R. A. Adolph, Y. Boutemy, J. C. Cheeseborough, III, J. S. Hall, D. C. McKeon, D. Pittman, B. Seeman, and S. R. Thomas, SPE 21413, presented to the SPE International Arctic Technology Conference, Anchorage, Ak., May 29-31, 1991; presented to the Middle East Oil Show & Conference, Bahrain, Nov. 16-19, 1991 showed the related effects previously discussed on the measurements (biases) and demonstrated that the bias effects on the measurement were addressed.

The root cause of the problem has to do with the component materials used in the radiation detectors where these materials have a high affinity for interacting with neutrons of various energies, including thermal, epithermal, and fast and the production and detection of associated particles resulting from these interactions. In the early 80's, the best downhole detector meeting the needs of the inelastic measurement was NaI, which has a very high affinity for neutrons of all energies (fast, thermal, and epithermal). In the late 80's gadolinium oxyorthosilicate (GSO or $Gd_2SiO_5$) became available, which did not have the problematic fast component other than silicon and oxygen, which were already present in the formation. However, it had a very large thermal and epithermal neutron component. Bismuth germanate (BGO or $Bi_4Ge_3O_{12}$) also became available, which had minimal neutron response, but did not operate at elevated temperatures.

Classically, the thermal neutron component has been removed by surrounding the detector with a thermal neutron absorbing material, such as boron, as disclosed in U.S. Pat. No. 4,937,446 for the RST tool of Schlumberger Technology Corporation. The RST tool design included sufficient boron to remove all of the thermal neutron signal, and as much as reasonably possible, the epithermal neutron signal.

Down-hole density measurements using a sourceless technology have been proposed. With sourceless technology, the radiation used to produce the measurement will be produced from an electronic source. The change of this source type yields many benefits, but it introduces other issues that must be addressed in order to get full benefit from this technology.

One of those issues relates to handling the very high instantaneous count rate that can be present. Actually, the instantaneous detector countrate in a tool utilizing an accelerator source can be much higher than conventional tools for different reasons. First, for a radiochemical source, higher countrates are achieved by using a higher activity source so transportation issues are more restrictive. For regulatory concerns still, the maximum activity of these source has to be limited. An accelerator source can be turned off, so the radiation safety issues of transportation are minimized. For an accelerator source, the activity can be turned up, or down, electronically. Second, some accelerator technologies may need to operate, or the measurement may want to operate in, a pulsed mode, where all the radiation comes out in a short period of time, e.g. 5 µs. This means that during this burst of radiation, the detector must operate at a very high instantaneous countrate which many of the standard detectors cannot handle.

Therefore, there is a need for detectors that can handle very high instantaneous countrates, and still give a signal with the required signal to noise.

SUMMARY

According to some embodiments a system for detecting gamma-rays downhole is provided. The system includes a tool housing adapted and dimensioned to be deployed in a borehole within a subterranean formation; and a scintillator material mounted within the tool housing, and emitting light when gamma-rays are absorbed, the scintillator material having an associated decay time of less than about 100 ns and an associated resonance integral of less than about 100 barns. The system can include a photodetector mounted within the tool housing and adapted so as to detect light emitted by the scintillator material. The system can be of a type for detecting gamma-rays primarily produced by inelastic scattering, or neutron capture events. The system can also include a electronic neutron generator source adapted to emit neutrons into the subterranean formation so as to produce gamma-rays. According to some embodiments, the spacing between the nuclear source and the scintillator material is based in part on the selection of the scintillator material. The system can also include a data processing system adapted and programmed to ascertain one or more properties of the subterranean formation based at least in part on measurements of detected gamma-rays using an elemental yields type of processing.

According to some embodiments the system is primarily a lanthanum halide material such as $LaCl_3$, $LaBr_3$ or $La(Br,Cl)_3$. The tool housing can be adapted to be deployed in the borehole via a wireline cable, or can be adapted to be deployed in the borehole as part of a drill collar.

According to some embodiments a system for detecting gamma-rays that are primarily produced by neutron capture events downhole is provided. The system includes a tool housing adapted and dimensioned to be deployed in a borehole within a subterranean formation; a scintillator material mounted within the tool housing, and emitting light when gamma-rays are absorbed, the scintillator material including an lanthanum halide material; and a photodetector mounted within the tool housing and adapted so as to detect light emitted by the scintillator material.

According to some embodiments, a system for detecting gamma-rays downhole that are primarily produced by inelastic scattering is provided. The system includes a tool housing adapted and dimensioned to be deployed in a borehole within a subterranean formation; a scintillator material mounted within the tool housing, and emitting light when gamma-rays are absorbed; and a photodetector mounted within the tool housing and adapted so as to detect light emitted by the scintillator material. The system is adapted to maximize speed of measurement of the system.

According to some embodiments, methods are also provided for detecting gamma-rays downhole.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein.

DETAILED DESCRIPTION OF THE PREFERRED EMBODIMENTS

Figure 1A:
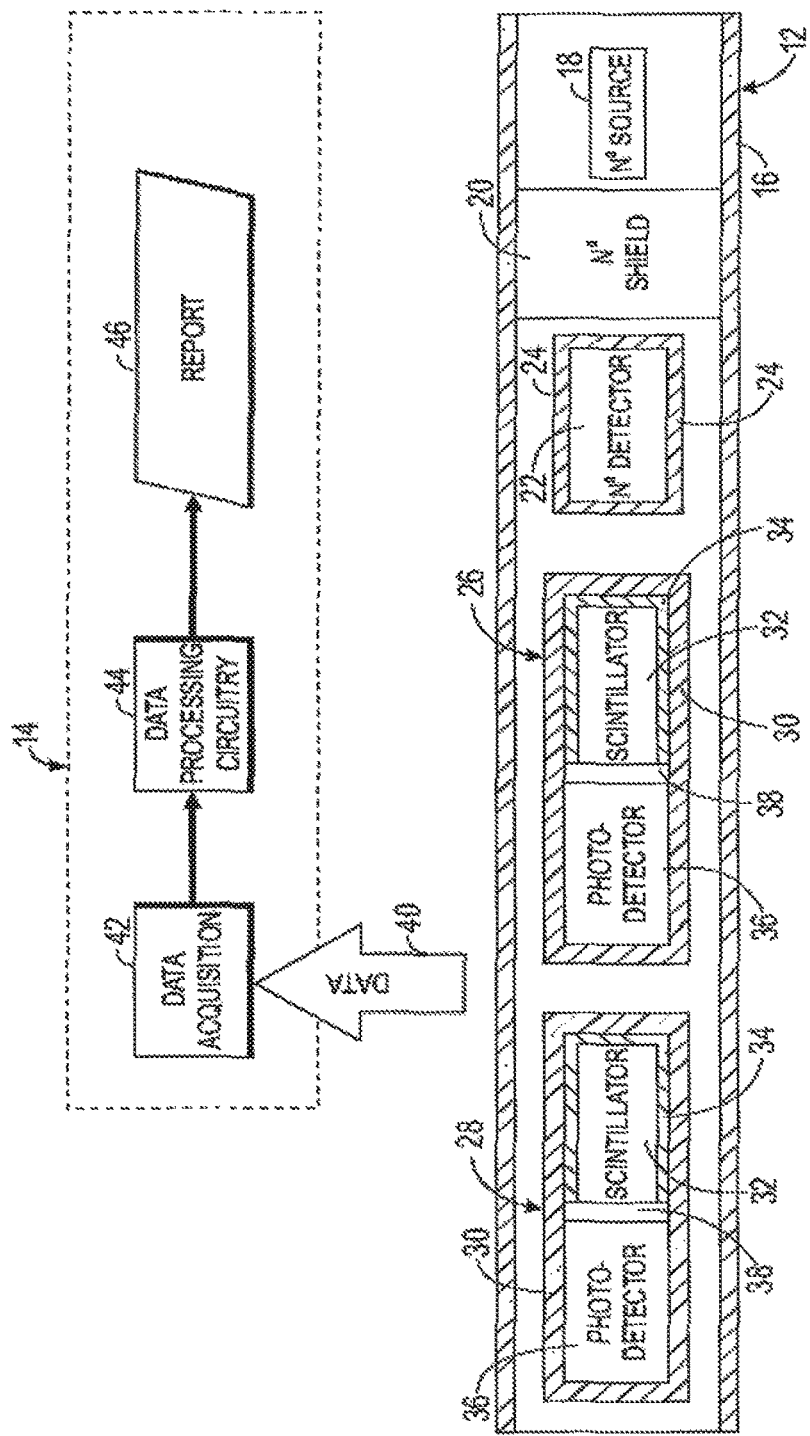
FIG. 1A illustrates a system for determining formation properties using inelastic or capture gamma-ray measurements, according to some embodiments.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

According to some embodiments, the selection of a gamma-ray detector is made depending on its properties and how those properties are affected by the data analysis. Desirable properties for a downhole detector include; high temperature operation, reliable/robust packaging, good resolution, high countrate capability, high density, high Z, low radioactive background, low neutron cross-section, high light output, single decay time, efficiency, linearity, size availability, etc. Since no single detector has the optimum of all these properties, a downhole tool design preferably picks the best combination of these in existing detectors, which will optimize the performance of the measurement in the required environment and live with the remaining non-optimum properties. Advantageously, a preferable detector choice is one where the required measurement precision (logging speed) is obtained for all of the required inelastic elements and/or minimization of unwanted background signals that complicate the data analysis.

Some embodiments of the presently disclosed subject matter generally relate to systems and methods for well logging using gamma-rays produced by inelastic scattering events ("inelastic gamma-rays"). Counts or spectra of inelastic gamma-rays may indicate a variety of properties of a surrounding subterranean formation. For example, in combination with a hydrogen index signal, a count of inelastic gamma-rays may enable determination of porosity and gas saturation. FIG. 1A illustrates a system for determining formation properties using inelastic gamma-rays, according to some embodiments. The system 10 includes a downhole tool 12 and a data processing system 14. By way of example, the downhole tool 12 may be a slickline or wireline tool for logging an existing well, or may be installed in a borehole assembly for logging while drilling (LWD). The data processing system 14 may be incorporated into the downhole tool 12 or may be at the surface at the wellsite or another remote location.

The downhole tool 12 may be constructed so as to improve detection of gamma-rays produced via inelastic scattering events, while reducing detection of gamma-rays produced via thermal and epithermal neutron capture events. Indeed, the downhole tool 12 may provide for a gamma-ray response substantially free of epithermal neutron capture background, such that the gamma-ray response is substantially independent of neutron porosity. The particular materials employed in each of the components may be described in greater detail below, with particular reference to FIG. 2. With continued reference to FIG. 1A, the downhole tool 12 may be surrounded by a housing 16 of cobalt-free steel. A neutron source 18 may be any suitable neutron source capable of emitting neutrons into a surrounding formation to produce inelastic gamma-rays. By way of example, the neutron source 18 may be a pulsed electronic neutron source, such as a Minitron™ by Schlumberger Technology Corporation. Additionally or alternatively, in certain embodiments, the neutron source 18 may be a radioisotope source capable of emitting fast neutrons. A neutron shield 20 containing elements with high (n,2n) cross sections, such as lead, bismuth or tungsten, may separate the neutron source 18 from various detectors in the downhole tool 12.

Certain embodiments of the downhole tool 12 may include a neutron detector 22, which may be surrounded by a cadmium-containing thermal neutron shield 24. The neutron detector 22, which may be a $^3$He neutron detector, may primarily detect epithermal neutrons rather than thermal neutrons, since the thermal neutron shield 24 may serve to prevent the passage of thermal neutrons to the detector 22. The downhole tool 12 may include a neutron monitor, not shown, which is located near the Minitron and detects primarily unscattered neutrons directly from the neutron generator. The neutron monitor, which may be a plastic scintillator and photomultiplier, provides a count rate signal proportional to the neutron output rate from the generator. The downhole tool 12 may include one or more gamma-ray detectors, illustrated in FIG. 1A as a "near" gamma-ray detector 26 and a "far" gamma-ray detector 28, each of which may be surrounded by a housing 30. As should be appreciated, the near gamma-ray detector 26 and the far gamma-ray detector 28 are so named due to their relative proximity to the neutron source 18. In some embodiments, a scintillator crystal 32 of the near gamma-ray detector 26 may be located approximately 8" to 22" from the neutron source 18, while the scintillator crystal 32 of the far gamma-ray detector 28 may be located approximately 15" to 36" from the neutron source 18.

As noted above, the near gamma-ray detector 26 and the far gamma-ray detector 28 may be contained in respective housings 30. For reasons described below, each of the housings 30 may contain materials incorporating $^6$Li, such as lithium carbonate ($Li_2CO_3$), which may substantially shield the gamma-ray detectors 26 and 28 from thermal neutrons without producing thermal neutron capture gamma-rays. The scintillator crystals 32 of the gamma-ray detectors 26 and 28 may enable detection counts or spectra of gamma-rays by producing light when gamma-rays are captured by the scintillator crystals 32. For reasons described below, housings 34 of aluminum alloy or fiberglass may surround the scintillator crystals 32 to reduce production of epithermal neutron capture gamma-rays. Depending on the application, the scintillator crystals 32 may be chosen to include any of a variety of materials, as described below. Photodetectors 36 may detect light emitted by the scintillator crystals 32 when a gamma-ray is absorbed, once the light has passed through an optical window 38, to obtain a gamma-ray count or spectrum signal.

The signals from the neutron detector 22, the near gamma-ray detector 26, and/or the far gamma-ray detector 28 may be transmitted to the data processing system 14 as data 40. The data processing system 14 may include a general-purpose computer, such as a personal computer, configured to run a variety of software, including software implementing all or part of the present technique. Alternatively, the data processing system 14 may include, among other things, a mainframe computer, a distributed computing system, or an application-specific computer or workstation configured to implement all or part of the present technique based on specialized software and/or hardware provided as part of the system. Further, the data processing system 14 may include either a single processor or a plurality of processors to facilitate implementation of the presently disclosed functionality.

In general, the data processing system 14 may include data processing circuitry 44, which may be a microcontroller or microprocessor, such as a central processing unit (CPU), which may execute various routines and processing functions. For example, the data processing circuitry 44 may execute various operating system instructions as well as software routines configured to effect certain processes and stored in or provided by a manufacture including a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the data processing circuitry 44 may process data provided as inputs for various routines or software programs, including the data 40.

Such data associated with the present techniques may be stored in, or provided by, the memory or mass storage device of the data processing system 14. Alternatively, such data may be provided to the data processing circuitry 44 of the data processing system 14 via one or more input devices. In one embodiment, data acquisition circuitry 42 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the data processing system 14 may exchange data and communicate with other networked electronic systems, whether proximate to or remote from the system. The network may include various components that facilitate communication, including switches, routers, servers or other computers, network adapters, communications cables, and so forth.

The downhole tool 12 may transmit the data 40 to the data acquisition circuitry 42 of the data processing system 14 via, for example, a telemetry system communication downlink or a communication cable. After receiving the data 40, the data acquisition circuitry 42 may transmit the data 40 to data processing circuitry 44. In accordance with one or more stored routines, the data processing circuitry 44 may process the data 40 to ascertain one or more properties of a subterranean formation surrounding the downhole tool 12. Such processing may involve, for example, one or more techniques for removing an epithermal neutron capture background from a gamma-ray count, as described below. The data processing circuitry 44 may thereafter output a report 46 indicating the one or more ascertained properties of the formation, such as porosity and gas saturation, as discussed below. The report 46 may be stored in memory or may be provided to an operator via one or more output devices, such as an electronic display and/or a printer.

Figure 2:
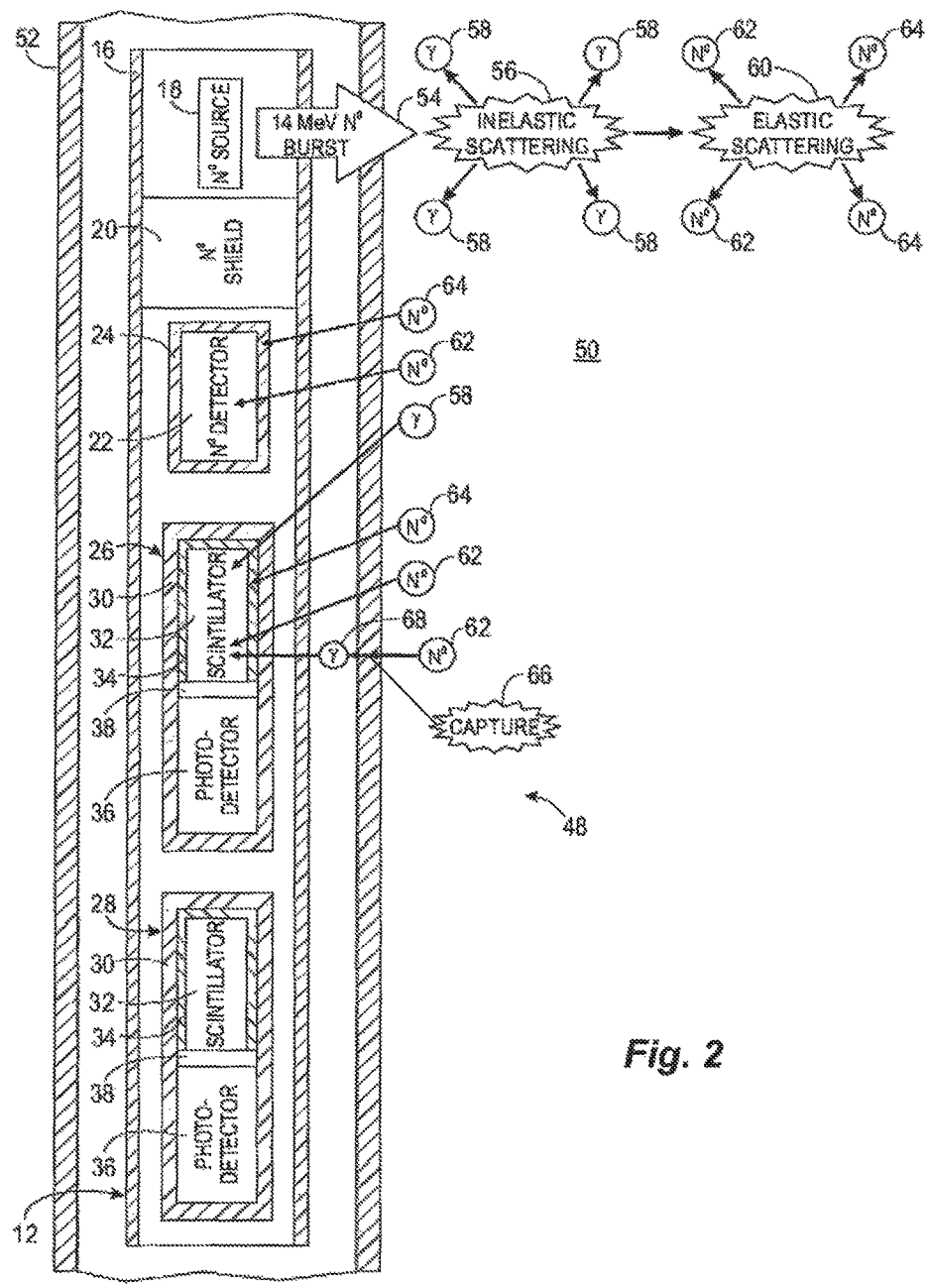
FIG. 2 illustrates a well-logging operation involving the downhole tool in a surrounding subterranean formation, according to some embodiments.

FIG. 2 illustrates a well-logging operation involving the downhole tool in a surrounding subterranean formation, according to some embodiments. In the operation 48 depicted in FIG. 2, the downhole tool 12 has been lowered into an existing well surrounded by casing 52 in a subterranean formation 50. The well-logging operation 48 may begin when the neutron source 18 outputs a burst of neutrons 54 of approximately 14.1 MeV or greater into the surrounding formation 50. Initially, the burst of neutrons 54 may collide with nuclei of the formation 50 in inelastic scattering events 56, which causes inelastic gamma-rays 58 to be emitted and the neutrons of the burst of neutrons 54 to lose energy. Following the inelastic scattering events 56, the neutrons of the burst of neutrons 54 may interact with the formation 50 in elastic scattering events 60, which causes the neutrons to drop in energy to eV and sub-eV levels as epithermal neutrons 62 and/or thermal neutrons 64.

The inelastic gamma-rays 58 produced by the inelastic scattering events 56 may subsequently Compton-scatter due to electrons in the formation 50. Some of the inelastic gamma-rays 58 may ultimately be detected in the near gamma-ray detector 26 or the far gamma-ray detector 28. The resulting count of the gamma-rays 58 may be sensitive to formation density for at least two reasons. First, the probability that one of the neutrons of the burst of neutrons 54 will interact with a nucleus of the formation 50 may be proportional to the number density of nuclei in the formation 50. Thus, if the formation 50 includes a greater number density of nuclei, a greater number of the neutrons of the burst of neutrons 54 may inelastically scatter 56 closer to the neutron source 18. As such, a lessor number of the inelastic gamma-rays 58 may be created farther from the near gamma-ray detector 26 or the far gamma-ray detector 28. Second, the inelastic gamma-rays 58 created by the inelastic scattering events 56 may Compton-scatter more frequently if the formation 50 is more dense. As a result, the gamma-rays 58 may be less likely to reach the near gamma-ray detector 26 or the far gamma-ray detector 28 before being photo-electrically absorbed by the formation 50.

Either of the above-described effects may lead to a lower gamma-ray count as the density of the formation 50 increases. It should be noted, however, that the former effect is sensitive to the nucleus number density of the formation 50, while the latter effect is sensitive to the electron number density of the formation 50 or, approximately, the bulk density of the formation 50. The nucleus number density may not correlate well with bulk density because heavy nuclei and light nuclei often have similar neutron interaction probabilities; however, the combination of nuclei number density and bulk density obtained from a neutron-gamma measurement may be used in much the same way as a conventional density measurement based on Compton scattering of gamma-rays.

A complication may arise, however, due to the interaction of the neutrons of the neutron burst 54 with hydrogen in the formation 50. Because elastic scattering 60 occurs primarily due to interactions with hydrogen in the formation 50, the number of low-energy epithermal neutrons 62 and thermal neutrons 64 that reach the vicinity of the gamma-ray detectors 26 and 28 may accordingly be strongly influenced by the hydrogen index of the formation 50. If one of the epithermal neutrons 62 or thermal neutrons 64 were captured by a nucleus at or in the vicinity of the near gamma-ray detector 26 or the far gamma-ray detector 28, such as in the casing 52, a neutron capture event 66 may occur. Such a neutron capture event 66 may produce a neutron capture gamma-ray 68 that may be detected by the gamma-ray detector 26 or 28. Without correction, neutron capture gamma-rays 68 may completely overwhelm the inelastic gamma-rays 58, resulting in gamma-ray counts with the character of neutron porosity measurements, rather than density measurements. Such measurements would be of less use to combine with a neutron porosity measurement to identify gas because the two measurements would not be independent.

For this reason, the downhole tool 12 may contain materials carefully chosen to reduce or eliminate neutron capture events 66 occurring in the downhole tool 12. Moreover, because some neutron capture events 66 may yet still occur in the downhole tool 12, and because some neutron capture events 66 may take place externally to the downhole tool 12, various techniques may be employed to reduce or eliminate any remaining neutron capture background from gamma-ray signals of the gamma-ray detectors 26 and/or 28. In particular, the materials chosen and the techniques employed may reduce or eliminate not only thermal neutron capture background, but also epithermal neutron capture background, from gamma-ray signals detected by the gamma-ray detectors 26 and/or 28. Additionally, certain materials in the downhole tool 12, such as the scintillator crystals 32, may be chosen based on additional criteria particular to a chosen well-logging application.

Although the discussion above relating to FIG. 1A and FIG. 2 pertain mainly to inelastic measurement modes, according to some embodiments FIG. 1A and FIG. 2 pertain to capture measurements. For the capture measurements, background exists in the form of some epithermal background but can be dominated by the thermal neutrons hitting and interacting with the tool and detector. Classically, this has been removed by the use boron shielding, around the detector and preferably around the entire tool.

Figure 1B:
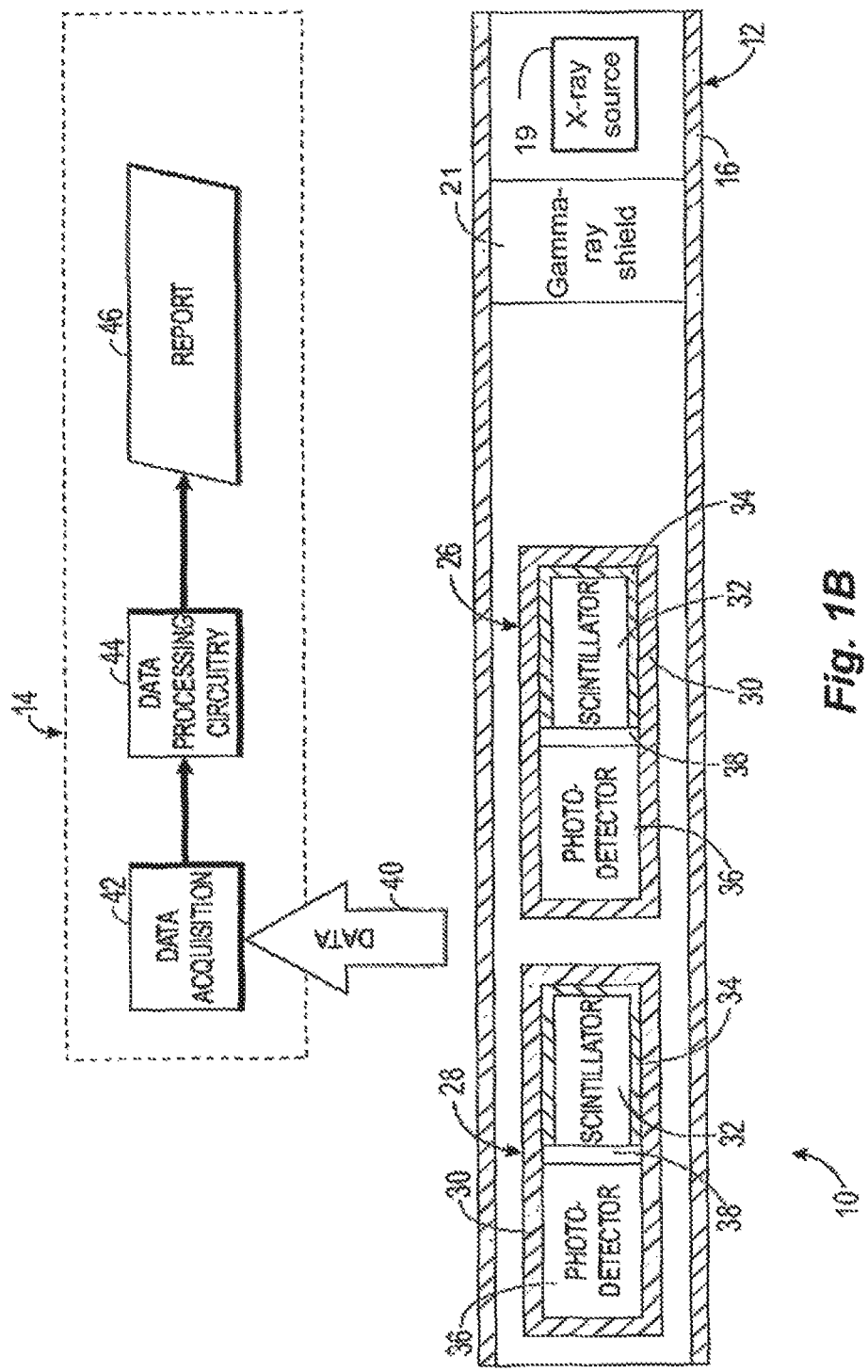
FIG. 1B illustrates a system for determining formation density using gamma-ray measurements, according to some embodiments.

FIG. 1B illustrates a system for determining formation density using gamma-ray measurements, according to some embodiments. FIG. 1B is similar to FIG. 1A, except that there is no neutron detector, a gamma-ray shield 21 is included instead of a neutron shield, and an x-ray source 19 is included instead of a neutron source. When using an x-ray source 19 for a density measurement instead of the standard radiochemical logging source, the instantaneous countrates experience by the detectors 26 and 28 can be significantly higher than that observed from the radiochemical source. For these applications, selection of a detector with high count rate capabilities (i.e. a fast decay time) will allow the proper processing of these counts to minimize losses and distortion. A proper selection of the detector type for this application (see Table 12) would suggest a detector with a decay time of less than 40 ns would be preferred.

In a preferred embodiment of this invention, a Lanthanum halide (La-halide) detector for the inelastic gamma-ray spectroscopy measurement is used. The La-halide choice for inelastic spectroscopy is based on a study evaluating various detectors for the inelastic spectroscopy measurement with regards to optimizing the measurement for precision (or logging speed) which, at the same time, optimizes the response for the most statistically significant number of elemental yields. This evaluation is done by combining several important factors and their effect on the logging speed (precision), e.g.

(Rel. Logging Speed)~(Rel. Spectral Quality)*(Rel. Efficiency)*(Rel. Max Counting Rate)*(Rel. Logging speed due to Bkg. component)

where: (1) Spectral Quality (higher value is better) is a measure of the ability to separate, by the least-squares process, different elements in a statistical manner and includes many detector properties, e.g., light output, atomic number, temperature response, peak-to-Compton, size, and resolution; (2) Efficiency (higher value is better) is a measure of the fraction of high-energy gamma-rays absorbed that pass through the detector and are therefore detected and is related to the detector size, density, and atomic number; (3) Max Counting Rate (higher value is better) is a measure of how fast the detector is able to detect and process individual gamma-rays that are absorbed in the detector and is based on the light production and decay properties of the detector; and (4) Relative Improvement due to Neutron Bkg Removal (higher value is better) is a measure of the statistical improvement in the measurement due to a change in the background neutron signal in the detector.

Table 1 illustrates how these properties may vary for scintillator crystals of the same size of various types. The last two columns of Table 1 describe the relative logging speed (higher value is better) for the detector when all other factors are the same. Specifically, relative logging speed (no neutron limit) representing when measurements taken with a scintillator crystal are not neutron limited, meaning that enough neutrons are produced so as to push the scintillator crystal to its limit. Relative logging speed (neutron limited) provides a value representing when measurements taken with a scintillator are neutron limited, meaning that fewer neutrons are produced than a maximum capability of the scintillator. The numbers provided in Table 1 are based on a least-squares processing method, but it should be appreciated that the data may also be processed using a standard "windows" processing.

It should be appreciated that, in optimizing a tool containing one of the scintillator crystals listed above in Table 1, one would also adjust the position of the scintillator crystal relative to the neutron source, which may optimize the countrate of the scintillator crystal versus the degradation in formation response. Therefore, an optimum tool design may have an effective relative logging speed somewhere between the values in the two columns. It should also be noted that the spectral quality factor, neutron background term, and efficiency may change as the size of the scintillator crystal changes, which may also affect the values in the last two columns. As apparent in Table 1, spectral quality may not significantly impact the values of relative logging speed, but the three remaining factors may significantly impact the values of relative logging speed.

By choosing the scintillator crystal 32 such that the epithermal neutron capture background is low enough such that the epithermal component does not have to be removed by other means, an inelastic gamma-ray spectroscopy measurement may be improved due to various factors. First, if the epithermal capture background is not removed, the statistical variance (error) may not be inflated due to the process of subtracting the epithermal neutron capture background. Second, removal of unwanted counts may enable the designer of the downhole tool 12 to increase neutron output from the neutron source 18 or to change the spacing of the near and far gamma-ray detectors 26 and/or 28 such that the maximum count rate capability of each can be utilized for useful counts. Third, some potential complicated neutron physics may be removed from the petrophysical interpretation. The resulting better performance may be indicated by improved statistical precision and, hence, faster logging speed, by the ability to extract more statistically valid inelastic elements, and by the reduction of unwanted physics from the analysis.

To reduce the effect of neutron capture in the gamma-ray detectors 26 and/or 28, the scintillator crystals 32 may be

TABLE 1

| Detector | Relative Spectral Quality | Relative High-Energy Efficiency | Relative Improvement due to Neutron Bkg Removal | Relative Max Countrate | Relative Logging Speed (no neutron limit) | Relative Logging Speed (neutron limited) |
| --- | --- | --- | --- | --- | --- | --- |
| LaCl | 1.63 | 0.32 | 1.26 | 11.5 | 16.2 | 1.23 |
| LaBr | 1.62 | 0.39 | 0.88 | 6.6 | 6.57 | 1.07 |
| NaI | 1.65 | 0.32 | 1.0 | 1.0 | 1.0 | 1.0 |
| GSO | 1.84 | 0.66 | 0.64 | 3.9 | 4.52 | 1.48 |
| BGO | 2.60 | 0.61 | 1.20 | 0.77 | 2.25 | 3.63 |
| LuAP | 1.39 | 0.90 | 0.57 | 13.6 | 12.1 | 1.35 |
| LuAG | 2.0 | 0.90 | 0.57 | 6.6 | 10.0 | 1.94 |

Figure 4:
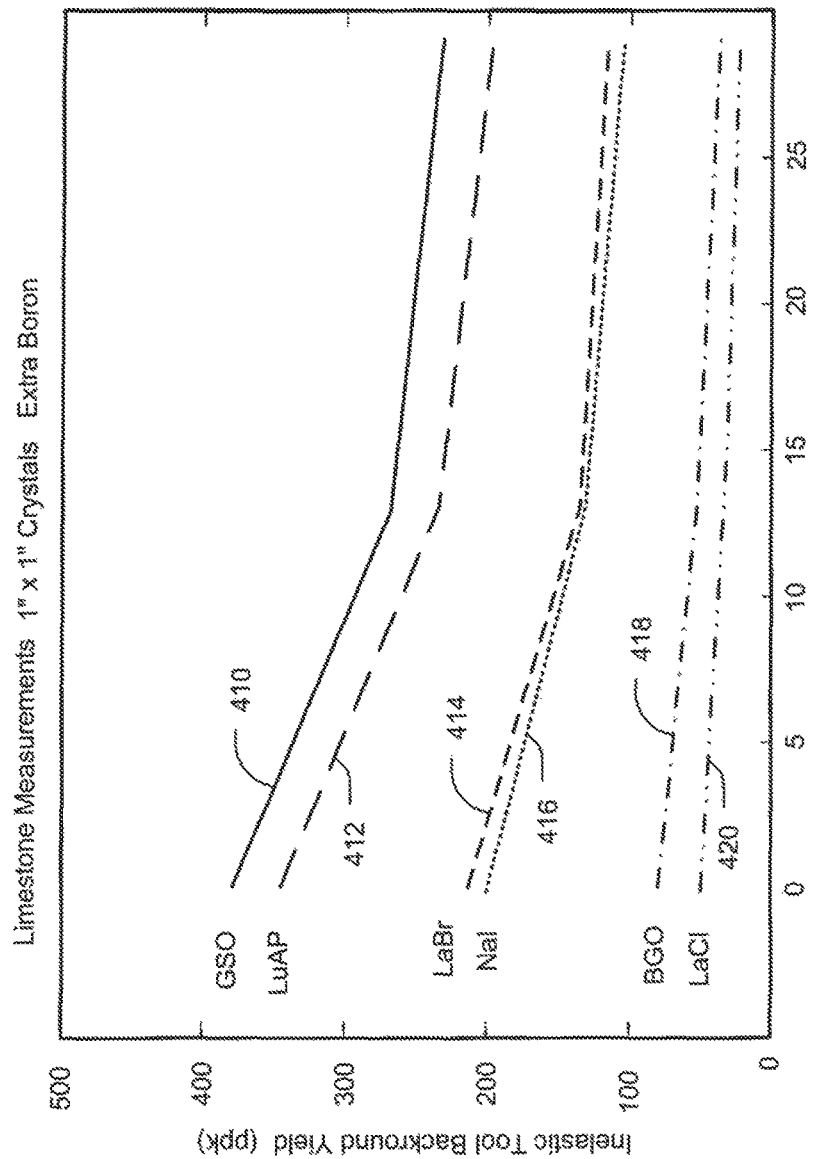
FIG. 4 is a plot illustrating the measured epithermal neutron capture background in a limestone formation for six 1"×1" scintillator crystals of the types listed in Table 1, according to some embodiments.

FIG. 4 is a plot illustrating the measured epithermal neutron capture background in a limestone formation for six 1"×1" scintillator crystals of the types listed in Table 1, according to some embodiments. The ordinate represents epithermal neutron capture background in units of (ppk), and the abscissa represents porosity in units of porosity units (pu). Curves 410, 412, 414, 416, 418, and 420 plot the measured epithermal neutron capture background for GSO, LuAP, LaBr, NaI, BGO, and LaCl, respectively. As shown in the plot of FIG. 4, scintillator crystals of GSO (gadolinium oxyorthosilicate, or $Gd_2SiO_5$) and LuAP ($LuSiO_3$) have the highest epithermal neutron background, followed by the scintillator crystals of $LaBr_3$ and NaI. The scintillator crystals of $LaCl_3$ and BGO have the lowest epithermal neutron capture background. It should be noted that the data presented in the plot of FIG. 4 closely follow Table 2, which lists the resonance integral of the above materials.

Based on the above considerations, the scintillator crystal 32 in the gamma-ray detectors 26 and/or 28 of the downhole tool 12 may include materials with a resonance integral less than 12, such as BGO (bismuth germinate, or $Bi_4Ge_3O_{12}$); and $LaCl_3$. In particular, the scintillator crystals 32 may be formed of a lanthanum-halide scintillator crystal, such as LaCl, for inelastic gamma-ray spectroscopy applications. With such materials, epithermal neutrons 62 that pass through components of the downhole tool 12 to reach one of the scintillator crystals 32 may be less likely to cause neutron capture events 66 within the scintillator crystals 32. Accordingly, epithermal neutron capture gamma-ray background may be reduced.

surrounded by thermal neutron shields 34. Specifically, to reduce thermal neutron capture gamma-ray production, the thermal neutron shields 34 may employ a material enriched with the isotope $^6Li$, which has a relatively high thermal neutron capture cross section, but which also produces primarily charged particles in lieu of gamma-rays. Candidate materials include lithium carbonate ($Li_2CO_3$) embedded in epoxy, or metallic lithium hermetically sealed in a metal can. As illustrated in FIG. 2, when the thermal neutron shields 34 include such a material, thermal neutrons 64 that reach the thermal neutron shields 34 may be absorbed without the production of neutron capture gamma-rays 68.

Since the thermal component has been classically removed by boron shielding, an embodiment of the invention relates to choosing a class of detectors that has a low epithermal component or neutron cross-section. A good indicator of this is the elemental "resonance integral", which is the integral cross-section for interaction in the neutron resonance energy ("epithermal") region. The resonance integral for detector materials (taken from "Nuclides and Isotopes Chart of the Nuclides", Knolls Atomic Power Laboratory, $12^{th}$ edition) of interest is shown below:

TABLE 2

| Element | $s_a$ | Resonance Integral (barns) | Relevant Material |
| --- | --- | --- | --- |
| Gd | 49000 | 400 | GSO |
| La | 9 | 12 | Lanthanum halide detectors |

TABLE 2-continued

| Element | $s_a$ | Resonance Integral (barns) | Relevant Material |
|---|---|---|---|
| Si | 0.16 | 0.08 | GSO, Glass scintillators |
| O | 0.003 | 0.03 | GSO, Glass scintillators |
| Na | 0.53 | 32 | NaI detector |
| Cl | 33 | 12 | $LaCl_3$ detector |
| Br | 6.8 | 92 | $LaBr_3$ detector |
| I | 6.2 | 150 | NaI |
| Lu | 84 | 900 | Lu-based detectors |
| Y | 1.28 | 1 | Y-based detectors (e.g., $YAlO_3$) |
| Al | 0.233 | 0.17 | YAP detectors |
| Bi | 0.034 | 0.22 | BGO detectors |
| Ge | 2.2 | 6 | BGO detectors |
| Ce | 0.6 | 0.7 | Activator in $LaCl_3$, $LaBr_3$, GSO |

Comparing the data of Table 2 with the neutron performance factor of Table 1 shows that the resonance integral is a good indicator of which detectors will have better or worse performance in the area.

As described above, FIG. 4 shows the measured background from measurements in a downhole tool geometry due to epithermal neutrons for 6 different detector types. It is plotted as a function of porosity since the porosity will affect how many epithermal neutrons are reflected back at the detector. Here it can be seen that GSO (gadolinium oxyorthosilicate: $Gd_2SiO_5$) and lutetium-based scintillators such as LuAP ($LuSiO_3$), have the highest background contribution followed by $LaBr_3$ and NaI, and finally with $LaCl_3$ and BGO having the lowest. Comparing this information with the resonance integrals of the detector elements shown in Table 1, shows the high correlation between the resonance integral and the amount of tool background.

By choosing the appropriate detector where this epithermal contribution is low enough such that the epithermal signal does not have to be removed by other means, results in better performance of the inelastic measurement. This improvement is due to several factors including, 1) no inflation of the statistical variance (error) due to having to subtract a background, 2) removal of unwanted counts allowing the designer to increase neutron output or change the detector spacing such that the maximum countrate capability of the detector can be utilized for useful counts, and 3) removing some potential complicated neutron physics from the petrophysical interpretation. The resulting better performance is indicated by 1) improved statistical precision and hence faster logging speed, 2) the ability to extract more statistically valid inelastic elements, and 3) reduce unwanted physics from the analysis.

Based on this type of analysis and real tool constraints as far as detector size, position, current quality of detectors, and detector types; the La-halide detectors are clearly superior for the inelastic spectroscopy measurement. This is all put together in FIG. 6 and FIG. 7, which show a comparison of predicted tool performance at elevated temperature using different detectors in an inelastic spectroscopy tool configuration. These results are shown for both a "least-squares" (labeled "yields") type of processing, and a "windows" type of processing. Schlumberger performs both types of processing in our commercial tools, while it is believed that other companies currently only use the "windows" processing. The RST tool shown in the plot is a commercial service based on a GSO detector. As can be observed, the improvement for the "yields" processing is more significant with this detector selection than it is for the "windows" processing.

Figure 7:
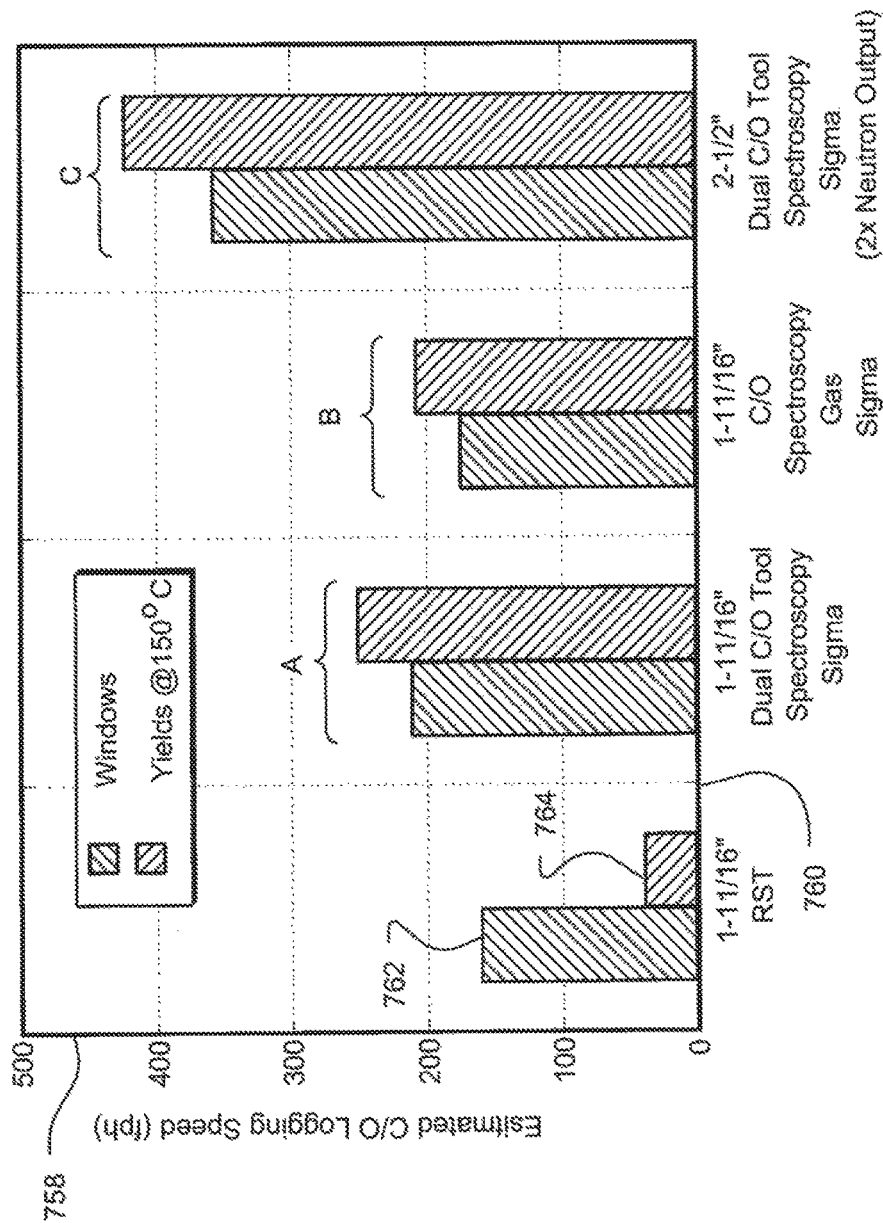
FIG. 7 is a bar graph illustrating a comparison of C/O logging speed attainable with various configurations of a downhole tool according to some embodiments, and with existing tools.

FIG. 7 is a bar graph illustrating a comparison of C/O logging speed attainable with various configurations of a downhole tool according to some embodiments, and with existing tools. An ordinate 758 represents estimated C/O logging speed in units of feet per hour (fph), and an abscissa 760 represents "windows" processing performance, such as bar 762, and a least-squares ("yields") processing performance, such as bar 764, for various tools and configurations of the downhole tool 12. The Reservoir Saturation Tool (RST) by Schlumberger using a GSO detector is provided as a baseline measure of performance. As shown, the estimated C/O logging speed using the RST for inelastic gamma-ray spectroscopy may be approximately 160 fph using windows processing and approximately 40 fph using least-squares processing.

Figures 6A, 6B, 6C:
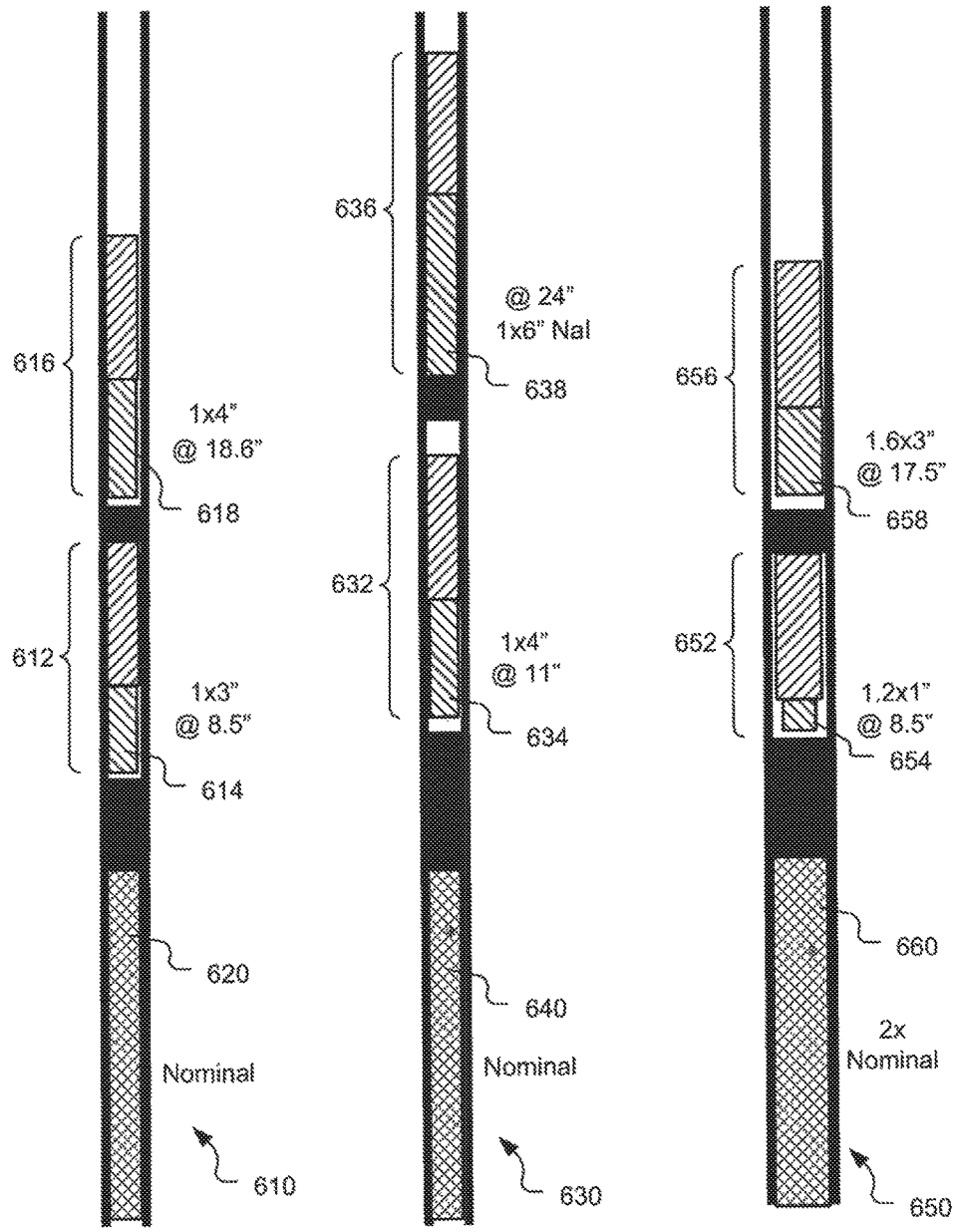
FIGS. 6A-C illustrate three different C/O tool configurations based on slightly different performance criterion using a LaCl detector, according to some embodiments.

The performance of various additional configurations of the downhole tool 12 are shown in the bar graph of FIG. 7 as tool configurations A, B, and C (corresponding to the configurations of tool 610 in FIG. 6A, tool 630 in FIG. 6B, and tool 650 in FIG. 6C, respectively). FIGS. 6A-C illustrate three different C/O tool configurations based on slightly different performance criterion using a LaCl detector, according to some embodiments. In FIG. 6A, the tool 610 in configuration A represents a 1¹¹⁄₁₆" configuration of the downhole tool 12 (shown in FIGS. 1A and 2) in which the near gamma-ray detector 612 (corresponding to detector 26 in FIGS. 1A and 2) includes a scintillator crystal 614 (corresponding to crystal 32 in FIGS. 1A and 2) of LaCl of approximately 1"×3", located approximately 8.5" from the neutron source 620 (corresponding to source 18 in FIGS. 1A and 2), and the far gamma-ray detector 616 (corresponding to detector 28 in FIGS. 1A and 2) includes a scintillator crystal 618 (corresponding to crystal 32 in FIGS. 1A and 2) of LaCl of approximately 1"×4", located approximately 18.6" from the neutron source 620. The neutron source 620 may be configured to output neutron bursts with a nominal output strength for a standard device. The estimated C/O logging speed using the configuration of tool 610 for inelastic gamma-ray spectroscopy may be approximately 210 fph using windows processing and approximately 240 fph using least-squares processing.

In FIG. 6B, the tool 630 in configuration B represents a 1¹¹⁄₁₆" configuration of the downhole tool 12 shown in FIGS. 1A and 2, in which the near gamma-ray detector 632 (corresponding to detector 26 in FIGS. 1A and 2) includes a scintillator crystal 634 (corresponding to crystal 32 in FIGS. 1A and 2) of LaCl of approximately 1"×4", located approximately 11" from the neutron source 640 (corresponding to source 18 in FIGS. 1A and 2), and the far gamma-ray detector 636 (corresponding to detector 28 in FIGS. 1A and 2) includes a scintillator crystal 638 (corresponding to crystal 32 in FIGS. 1A and 2) of NaI of approximately 1"×6", located approximately 24" from the neutron source 640. The neutron source 640 may be configured to output neutron bursts 54 of a nominal amount for a standard device. The estimated C/O logging speed using the configuration B of tool 630 for inelastic gamma-ray spectroscopy may be approximately 180 fph using windows processing and approximately 205 fph using least-squares processing.

In FIG. 6C, the tool 650 in configuration C represents a 2½" configuration of the downhole tool 12 shown in FIGS. 1A and 2, in which the near gamma-ray detector 652 (corresponding to detector 26 in FIGS. 1A and 2) includes a scintillator crystal 654 (corresponding to crystal 32 in FIGS. 1A and 2) of LaCl of approximately 1.2"×1", located approximately 8.5" from the neutron source 660 (corresponding to source 18 in FIGS. 1A and 2), and the far gamma-ray detector 656 (corresponding to detector 28 in FIGS. 1A and 2) includes a scintillator crystal 658 (corresponding to crystal 32 in FIGS. 1A and 2) of LaCl of approximately 1.6"×3", located approximately 17.5" from the neutron source 660. The neutron source 660 may be configured to output neutron bursts 54 of approximately twice the nominal neutron output of a smaller diameter tool, approximately double the output of the neutron source 18 of the tools A and B. The estimated C/O logging speed using tool 650 in configuration C for inelastic gamma-ray spectroscopy may be approximately 350 fph using windows processing and approximately 420 fph using least-squares processing.

duction cross-sections are not well know for many of the elements found in the crystals we are studying.

The measurements made with a mockup tool for most of the crystals are listed below in Table 3. Most of these measurements were made for the purpose of deriving the capture and inelastic elemental standard spectra, with the primary element extracted from each measurement listed in the table in the columns labeled capture and inelastic. The oil-sand measurement was a recent addition for the purpose of estimating oil-saturation sensitivity and was not included in every measurement set. All told, 15 sets of measurements have been made as of this writing with 10 different crystals.

TABLE 3

List of measurements with the mockup tool for crystal evaluations

| Lithology | BHD | Por | Salinity | Capture | Inelastic | Time | Extra Stuff/Comments |
|---|---|---|---|---|---|---|---|
| Inf Water | x | 100 | Fresh | H | O | 3 hr | |
| Inf Water | x | 100 | 200 ppk | Cl | | 3 hr | |
| Inf Water | x | 100 | Fresh | CrNi | | 3 hr | Stainless borehole liner in water tank |
| Inf Water | x | 100 | Fresh | Fe | Fe | 3 hr | Iron mesh around tool |
| Inf Water | x | 100 | Fresh | Mg | Mg | 3 hr | Magnesium around tool |
| Inf Water | x | 100 | Fresh | Al | | 3 hr | Aluminum around tool |
| Sand | 8 | 14.2 | Fresh | Si | Si | 3 hr | |
| Lime | 8 | 13.2 | Fresh | Ca | Ca | 3 hr | |
| Lime | 8 | 29.3 | Fresh | | Tool | 3 hr | |
| Lime | 8 | 0 | Fresh | | Tool | 3 hr | |
| Dolo | 8 | 11.7 | Fresh | Mg | Mg | 3 hr | |
| Inf Oil | x | 100 | Fresh | | C | 3 hr | |
| Sand | 8 | 16 | Oil | | | 3 hr | For oil sensitivity |

Further detail on spectral analysis and elemental standards derivations will now be provided. There are quite a few tool-performance parameters that can be estimated by making measurements with a minitron-based mockup tool. Among the more important are described the following paragarphs.

The Spectral Quality for Both Capture and Inelastic Spectra.

This is a measure of the contribution to the statistical uncertainty due to how difficult it is to separate one element from another in a complex spectrum. This contribution can be estimated by deriving a complete set of elemental standard spectra and then extract the diagonal element of the weighted-least-squares error matrix.

The Absolute Efficiency for High-Energy Gamma Rays (>1.6 MeV).

This parameter is useful especially for minitron-limited tool designs. Typically, standard spectral analysis only includes events above 1.6 MeV so a higher density crystal will detect more such events per neutron emitted.

The Fraction of Counts Above 1.6 MeV.

This parameter is useful since the counts above 1.6 MeV are the measured spectroscopy signal. The counts below 1.6 MeV are most of the counts and they contribute to the total count rate, which is the throughput-limiting factor.

The Energy Resolution for High-Energy Gamma Rays.

This parameter is very useful for spectral quality since the capture and inelastic spectra are analyzed all the way out to 8-9 MeV; whereas, it is most common to measure energy resolution at low energies (e.g. 662 keV) with radioactive chemical sources.

Fast-Neutron Crystal Background.

Figure 8:
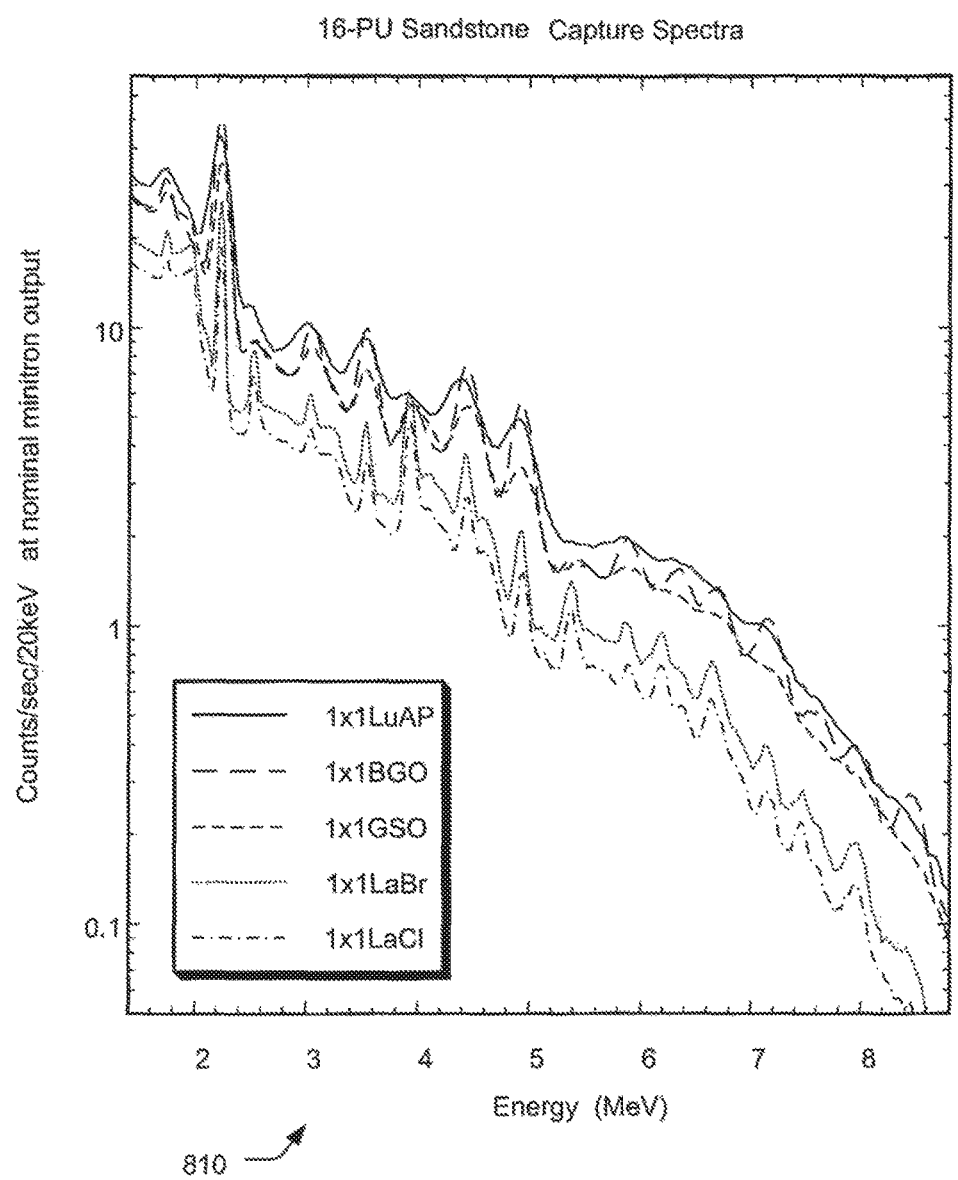
FIGS. 8 and 9 are plots comparing measured capture and inelastic spectra for 5 different detector materials, according to some embodiments
Figure 9:
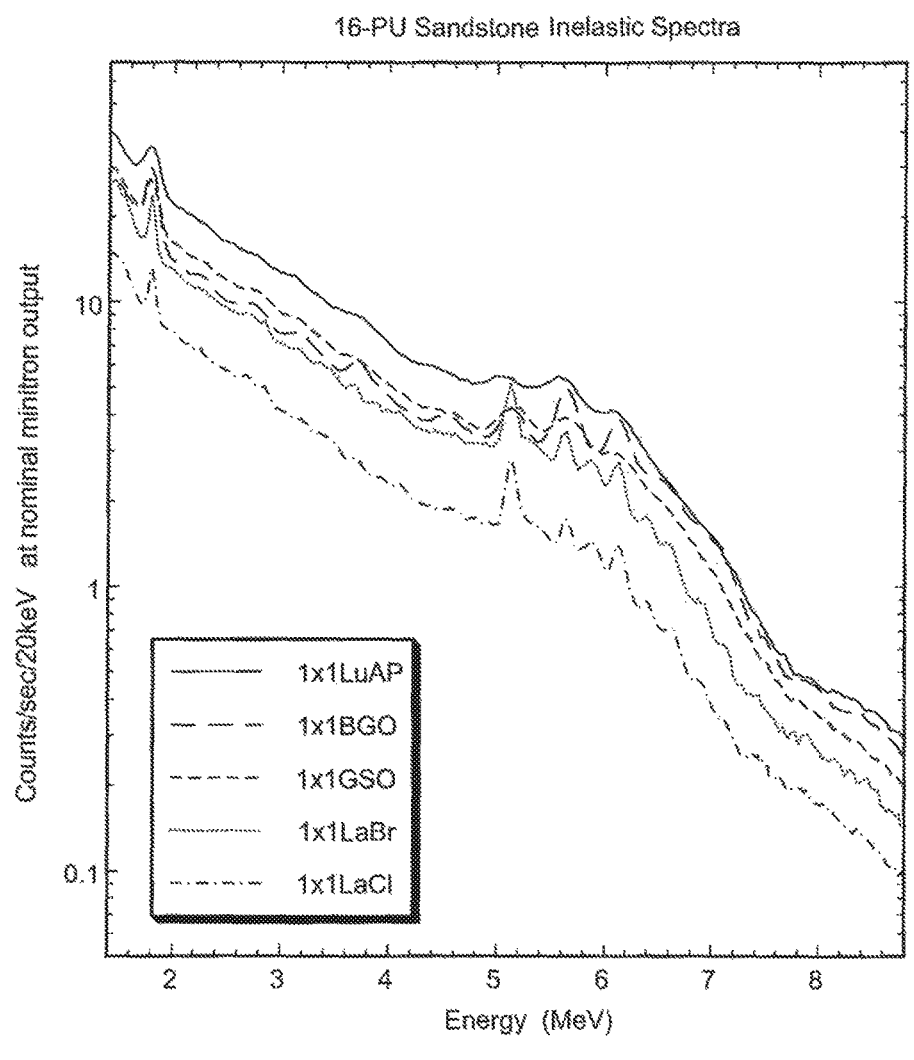

This can be a large contribution to the inelastic measurement for some crystals, and it may be difficult or impossible to calculate accurately since the fast-neutron gamma-pro- FIGS. 8 and 9 are plots comparing measured capture and inelastic spectra for 5 different detector materials, according to some embodiments. The spectra are all on an absolute scale, normalized to a nominal minitron output. Activation background has been subtracted from the capture spectra and capture background from the inelastic spectra. Differences in energy resolution and absolute efficiency for the different materials are readily apparent from the plots 810 in FIGS. 8 and 910 in FIG. 9.

Total Counting Efficiency Above 1.6 MeV.

Figure 10:
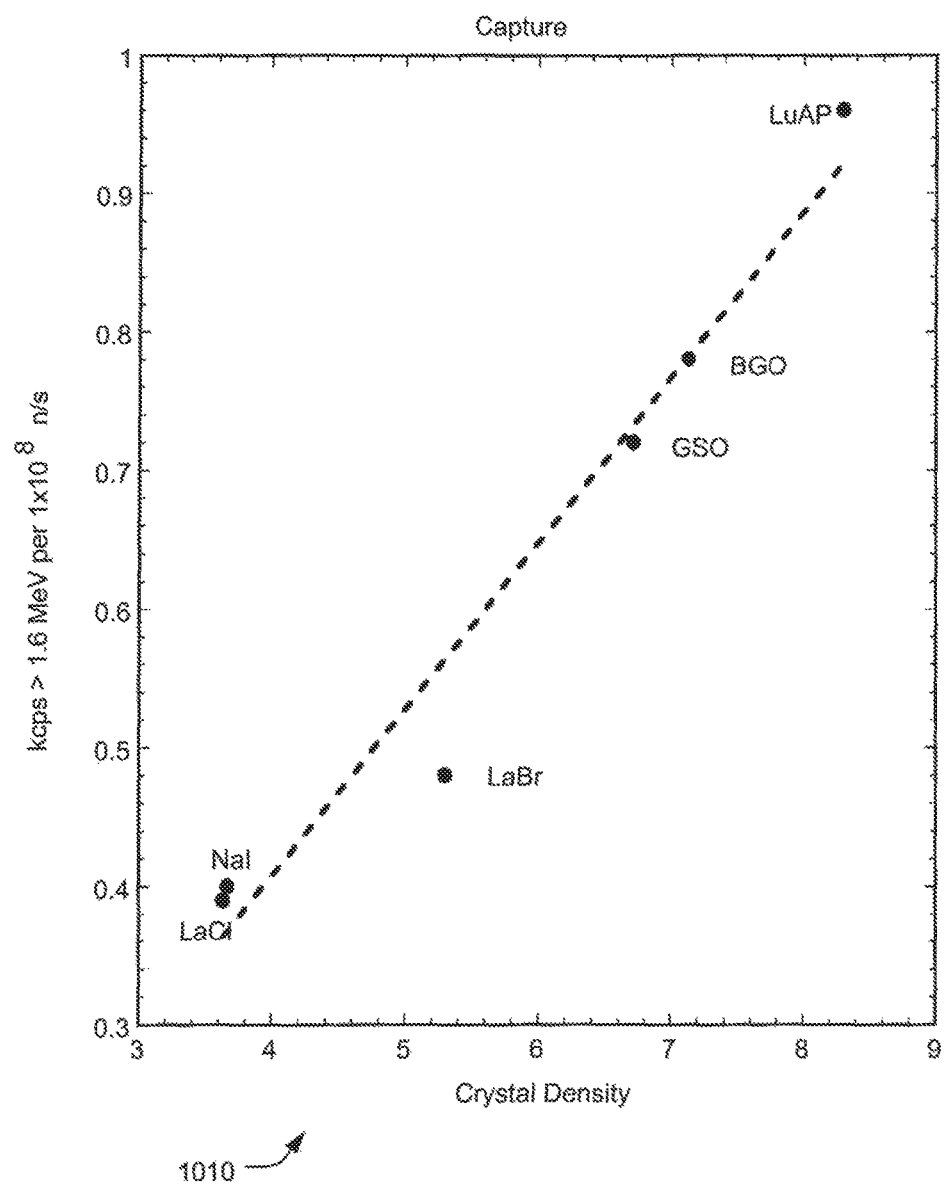
FIG. 10 is a plot showing the absolute capture count rate above 1.6 MeV for 6 different crystals tested, according to some embodiments.
Figure 11:
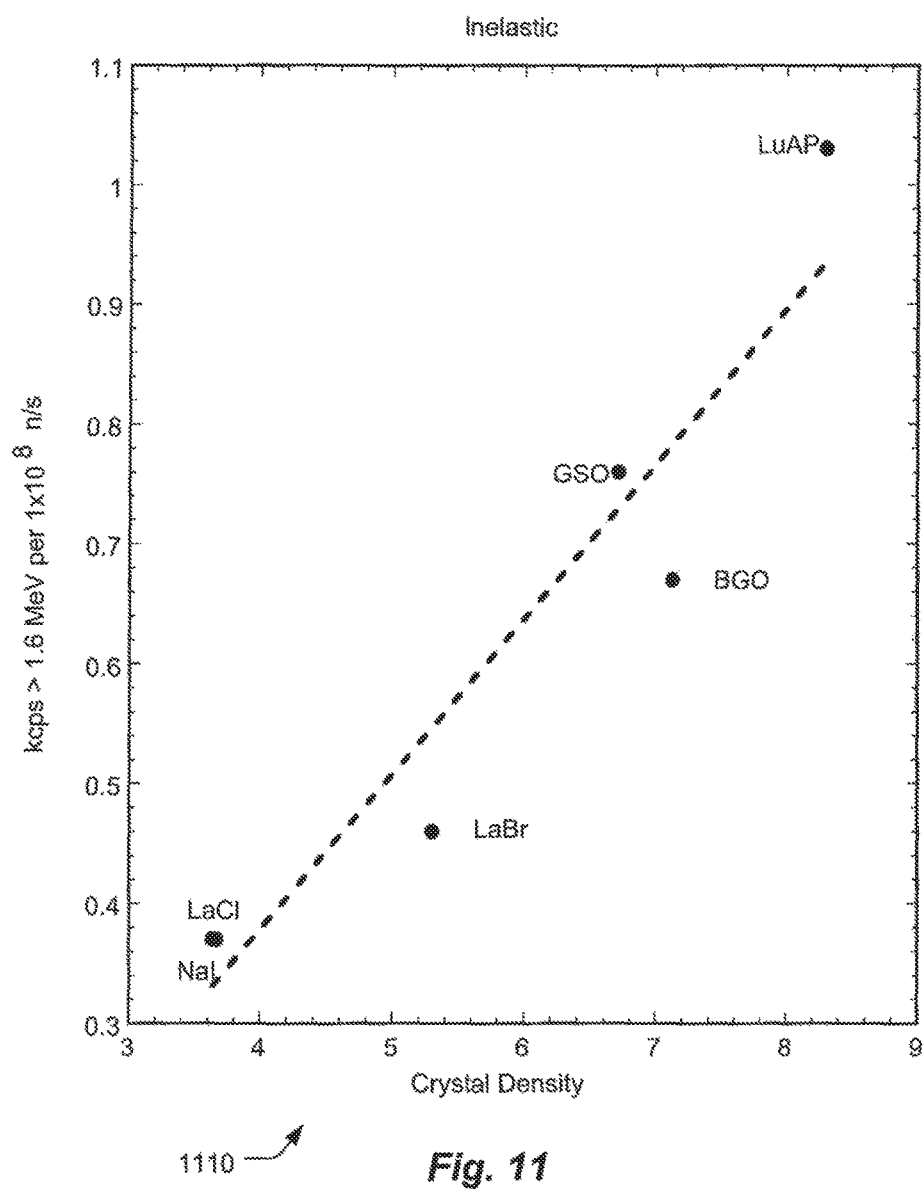
FIG. 11 is a plot showing the absolute inelastic count rate above 1.6 MeV for 6 different crystals tested, according to some embodiments.

Due to the vastly different densities of the crystals tested there is a significant difference in the counting efficiencies for the high-energy gamma rays detected in neutron-induced gamma-ray spectroscopy measurements. This is useful for minitron-limited tool designs, or for designs where it is desirable to run the minitron at lower outputs to achieve longer lifetimes. FIG. 10 is a plot showing the absolute capture count rate above 1.6 MeV for 6 different crystals tested, according to some embodiments. Plot 1010 shows the absolute capture count rate above 1.6 MeV plotted as a function of crystal density. The response is reasonably linear, with LuAP showing a significant efficiency advantage, and LaBr being measurably better than LaCl. FIG. 11 is a plot showing the absolute inelastic count rate above 1.6 MeV for 6 different crystals tested, according to some embodiments. As can be seen from plot 1110, the trend with density here is not as linear, most likely due to the perturbing effect of different sensitivities to epithermal neutrons in the different detector materials, which would inflate the count rates for GSO and LuAP.

Fraction of Counts Above 1.6 MeV.

Figure 12:
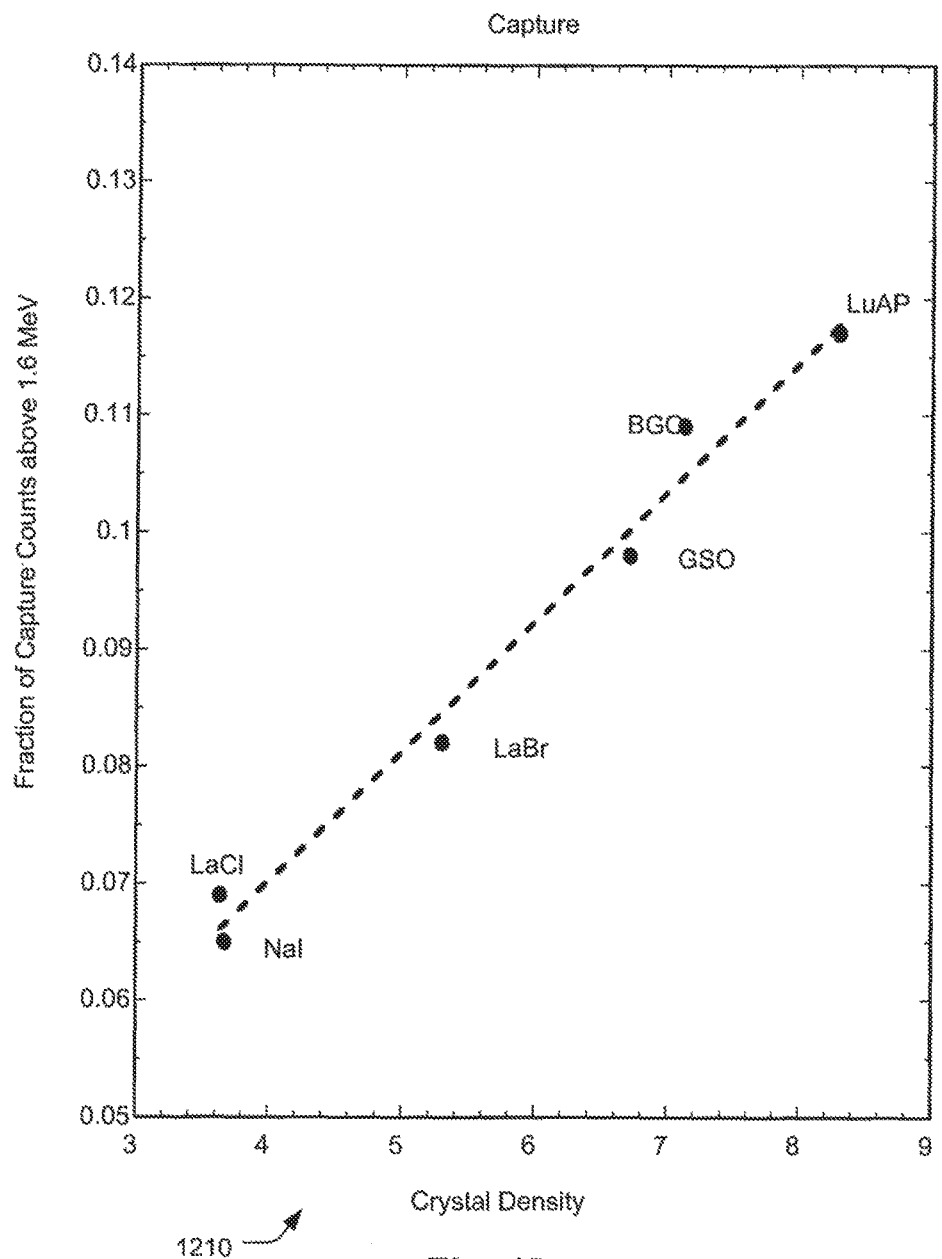
FIG. 12 is a plot showing the fraction for capture counts above 1.6 MeV, plotted against crystal density, according to some embodiments.
Figure 13:
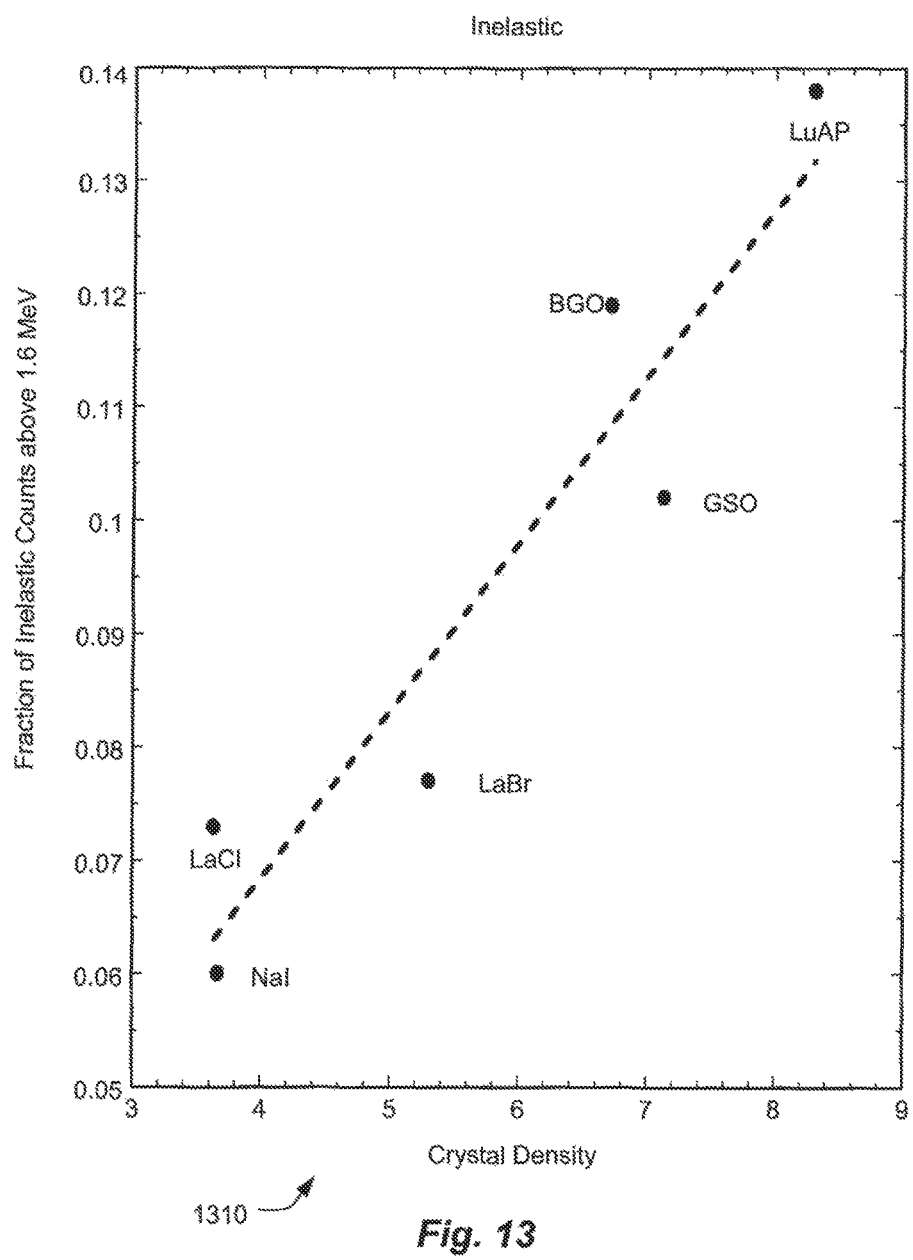
FIG. 13 is a plot showing the fraction for inelastic counts above 1.6 MeV, plotted against crystal density, according to some embodiments.

The fraction of counts above 1.6 MeV is an useful parameter for throughput-limited tool designs; i.e., throughput is limited by the total count rate, but only events above 1.6 MeV are spectrally analyzed. So the analyzed count rate would be the total throughput count rate (which is ultimately limited by the decay time of the light output) times the fraction above 1.6 MeV. FIG. 12 is a plot showing the fraction for capture counts above 1.6 MeV, plotted against crystal density, according to some embodiments. As can be seen from plot 1210, there is a reasonably linear trend. FIG. 13 is a plot showing the fraction for inelastic counts above 1.6 MeV, plotted against crystal density, according to some embodiments. From plot 1310, the trend with density is not quite as clear as the capture case, probably again due to the perturbing effect of the differing fast-neutron crystal background contributions.

Effective Energy Resolution.

The energy resolution measured at 662 keV is generally not a very good predictor of spectral quality for neutron-induced gamma-ray spectroscopy measurements because the energy range of interest is much larger, typically between 1.6 MeV and about 9 MeV. If the peak widths of all crystals increased linearly with the square root of the peak energy, as the resolution of the 6.4-MeV calcium peak would be a convenient approximation of the effective energy resolution.

Capture Standards Derivations.

Table 4 lists the measurements used to derive the capture elemental standards, along with the elemental yields, expressed in parts per thousand of the total spectrum, that were extracted from these measurements for the 1×1" LaCl series. Yields highlighted in underline indicate the primary measurement used to derive that particular elemental standard. As will be described below, the standard spectra for sulfur, gadolinium, potassium, and titanium were generated with the aid of a general-purpose Monte Carlo N-Particle (MCNP) code that can be used for neutron, photon, electron, or coupled neutron/photon/electron transport developed by Los Alamos National Laboratory. The standard labelled hfmb, hydrogen formation minus background, is also a calculation and represents the difference in spectral shape of the hydrogen standard depending on whether the gamma ray originated for the formation or the borehole.

TABLE 4

Capture elemental yields for the LaCl measurements used for standards derivation.

Figure 14:
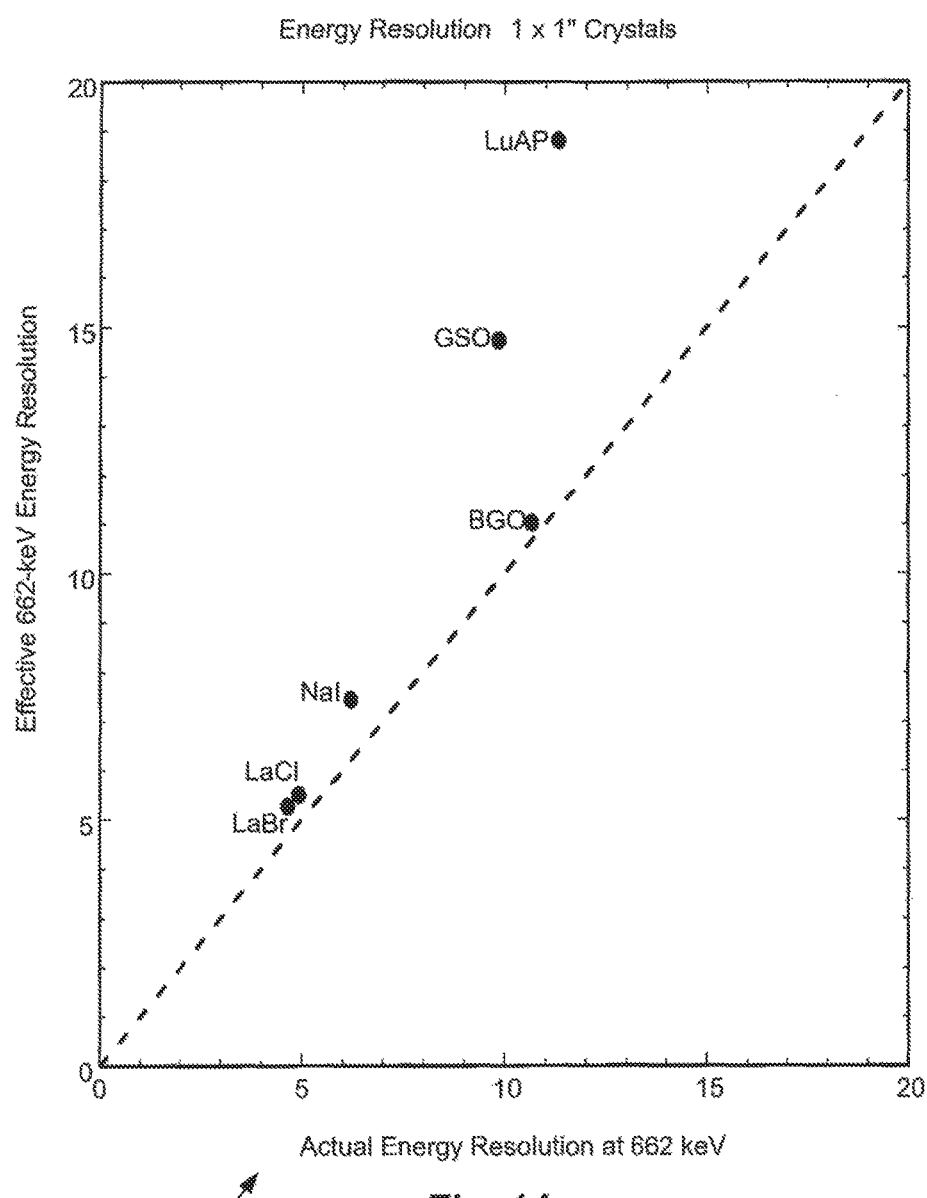
FIG. 14 is a plot showing the effective 663-keV energy resolutions calculated for 6 different crystal types compared to actual energy resolutions at 663 keV, according to some embodiments.
Figure 15:
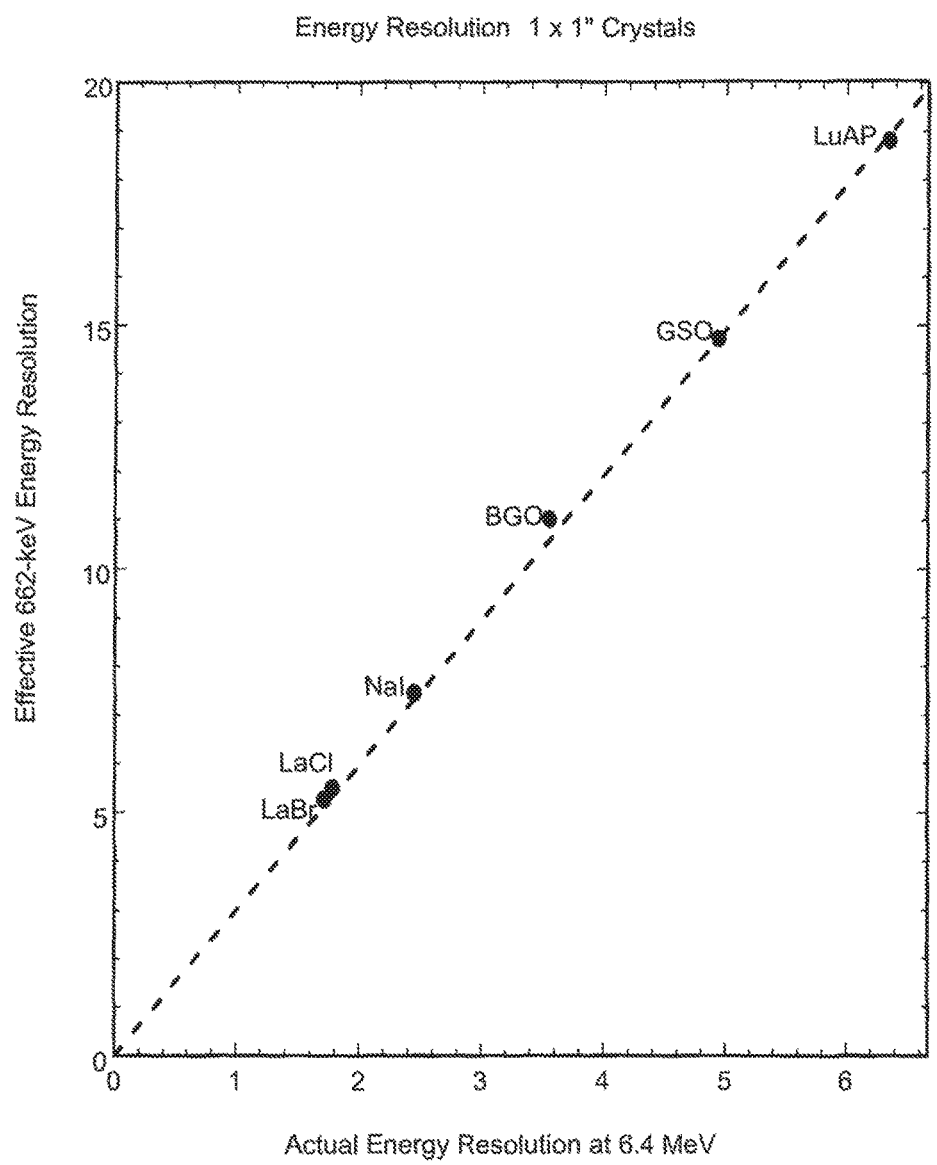
FIG. 15 is a plot showing effective 662-keV energy resolutions for 6 different crystal types, compared to actual energy resolutions at 6.4 MeV, according to some embodiments.

| Lithology | Por | Salinity | chy | cfe | crni | csi | cca | cmg | cchl | calu | csul | cgd | ck | cti | hfmb |
|---|---|---|---|---|---|---|---|---|---|---|---|---|---|---|---|
| Water | 100 | Fresh | <u>984</u> | 0 | 0 | 0 | 0 | −1 | 16 | 1 | 0 | 1 | −1 | 0 | 0 |
| Water/Fe | 100 | Fresh | 605 | <u>386</u> | 0 | 0 | 0 | 0 | 10 | −1 | 0 | 1 | 0 | 0 | 0 |
| Water/SST | 100 | Fresh | 892 | 53 | <u>40</u> | 0 | 0 | 0 | 15 | 0 | 0 | 1 | −1 | 0 | 0 |
| Sand | 14.2 | Fresh | 357 | 62 | 47 | <u>528</u> | 0 | 0 | 6 | 0 | 0 | 0 | 0 | 0 | 0 |
| Lime | 0 | Fresh | 433 | 5 | 6 | 19 | 536 | 1 | 31 | 10 | −2 | −13 | −2 | −4 | −20 |
| Lime | 13.2 | Fresh | 357 | 2 | 2 | 0 | <u>633</u> | 0 | 6 | 0 | 0 | 0 | 0 | 0 | 8 |
| Lime | 29.3 | Fresh | 426 | 1 | 1 | 3 | 556 | 0 | 11 | −2 | −1 | −1 | 0 | −1 | 8 |
| Dolo | 11.7 | Fresh | 367 | 73 | 42 | 27 | 394 | <u>55</u> | 25 | 3 | −6 | 20 | 12 | 1 | −12 |
| Water/Mg | 100 | Fresh | 945 | −1 | 1 | 6 | −1 | <u>19</u> | 9 | 9 | −3 | 8 | 4 | 2 | 1 |
| Salt | 100 | 200 ppk | 100 | 0 | 0 | 0 | 0 | 0 | <u>899</u> | 0 | 0 | 0 | 0 | 0 | 0 |
| Water/Al | 100 | Fresh | 885 | 0 | 0 | 0 | 0 | 0 | 14 | <u>100</u> | 0 | 1 | 0 | 0 | 0 | predicted by simple counting statistics based on the number of electrons produced, then it wouldn't matter because everything would scale uniformly. For some crystals, however, the peak widths increase much more quickly at higher energies. Since we are all familiar with evaluating crystals based on their resolution at 662 keV, it is convenient to define an effective 662-keV resolution for each crystal such that its spectral quality would be equivalent to that of a crystal of that 662-keV resolution which obeys the ideal square-root resolution dependence. FIG. 14 is a plot showing the effective 662-keV energy resolutions calculated for 6 different crystal types compard to actual energy resolutions at 662 keV, according to some embodiments. In plot 1410, six 1"×1" crystals evaluated here versus their measured resolutions at 662 keV. LaCl, LaBr, NaI, and BGO plot very close to the 1:1 line, indicating that they follow the ideal square-root dependence fairly closely. By contrast, the effective resolutions of GSO and most notably LuAP, are quite a bit higher than their actual 662-keV resolutions. The tendency for the energy resolution of LuAP crystals to deteriorate at high energy is a drawback to using this material for neutron-induced capture spectroscopy measurements. A better predictor of spectral quality would be the energy resolution of a peak toward the middle of the 1.6-9 MeV analysis region. One such convenient peak would be the 6.4-MeV line from calcium. FIG. 15 is a plot showing effective 662-keV energy resolutions for 6 different crystal types, compared to actual energy resolutions at 6.4 MeV, according to some embodiments. It can be seen from plot 1510 that there is a fairly linear dependence of the effective resolution versus the resolution at 6.4 MeV. Using 3 times Standards derivation uses a spectral stripping process to solve 2 or 3 equations at a time for 2 or 3 unknowns, with the unknowns being the elemental contributions to each measurement. The measurements are chosen so that they each contain a minimum number of different elements so that the problem is reasonably tractable. In addition to determining the correct stripping factor, the individual measurements also need to be gain matched and occasionally resolution matched. The PMT gain for these measurements was controlled using a Cs peak in the burst-off-background spectrum, however additional adjustments of up to a few tenths of a percent are still necessary for optimal gain matching. Since every measurement contains a distinct 2.2 MeV hydrogen peak we have gain matched all of the measurements to the gain of the water tank measurement. Occasionally some additional source of noise would be picked up, requiring a slight amount of resolution matching, usually in the form of a small deconvolution of the more noisy measurement.

Since there is a certain amount of subjectivity involved in the standards generation process, one concern may be how much consistency could be achieved, especially while deriving 15 sets of capture and inelastic standards over an extended period. After several less than satisfying attempts, the minitron monitor information was used instead. First, all measurements were normalized by time and the minitron monitor. Since the only thing changing between sets of measurements is the crystal, all of the stripping factors should actually be identical, or very nearly so. A stripping template was developed, first using the really good-resolution LaCl series. The template included all of the stripping operations needed together with all of the stripping factors. This template was used as a start for each subsequent crystal series. Changes were then made to the stripping factors only when they were clearly incorrect. The changes needed were only a few percent here and there, so confidence is high that consistency has been achieved. Note that it is not necessary that the monitor calibration be consistent across different sets of measurements, but rather only that it be consistent within each set.

Inelastic Standards Derivations.

Table 5 lists the measurements used to derive the inelastic elemental standards, along with the elemental yields, expressed in parts per thousand of the total spectrum, which were extracted from these measurements for the 1×1" GSO series. Yields highlighted in underline indicate the primary measurement used to derive that particular elemental standard. The standard spectrum for sulfur was calculated using the same techniques describe above for the capture standards.

includes the crystal contribution plus a smaller contribution from the pressure housing, which is subtracted in a later step using the iron signal derived from the Water/Fe measurement.

Figure 5:
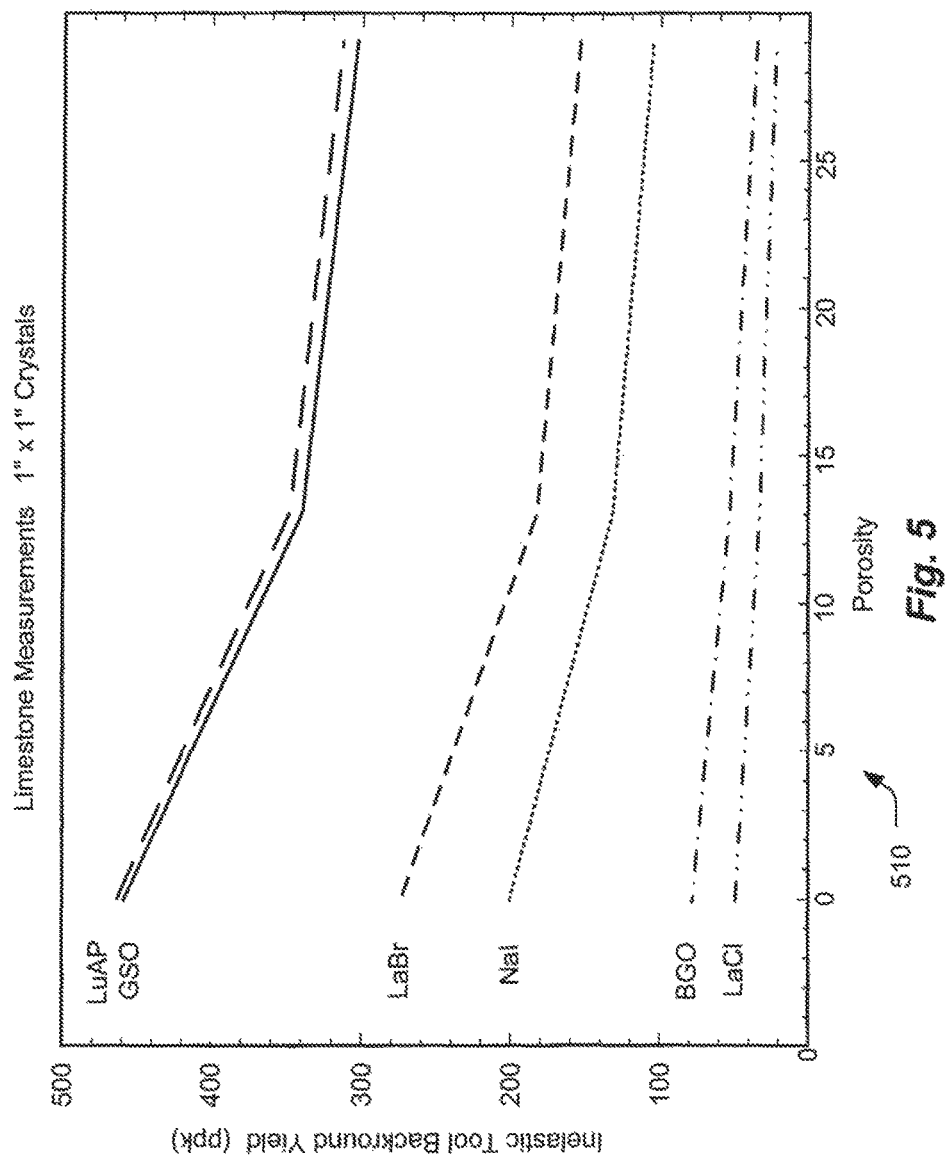
FIG. 5 shows a plot 510 that quantifies the tool background measured for the 6 different crystal materials as a function of porosity, according to some embodiments.

FIG. 5 shows a plot 510 that quantifies the tool background measured for the 6 different crystal materials as a function of porosity, according to some embodiments. Note that for LuAP and GSO, the crystal background is nearly 50% of the signal at low porosity. Most of the crystal background for these two materials is due to epi-thermal captures, which can be reduced somewhat by wrapping enriched boron around the crystal as is done for RST. FIG. 4 shows the result of wrapping enriched boron around LuAP, GSO, LaBr, and LaCl. A significant reduction in crystal background is achieved for GSO, LuAP, and LaBr confirming the large epi-thermal contributions for these materials. The extra boron had absolutely no effect on the already low LaCl background, which implies that there is no epi-thermal component to its background.

TABLE 5

Inelastic elemental yields for the GSO measurements used for standards derivation.

| Lithology | Por | Salinity | ic | io | isi | ica | ife | itb | img | isul | cor | wcor |
|---|---|---|---|---|---|---|---|---|---|---|---|---|
| Oil | 100 | Oil | <u>593</u> | 36 | 0 | 0 | 171 | 201 | 0 | 0 | 16.690 | 6.680 |
| Water | 100 | Fresh | 0 | <u>580</u> | 0 | 0 | 184 | 236 | 0 | 0 | 0.000 | 1.235 |
| Water/Fe | 100 | Fresh | 0 | 478 | 0 | 0 | <u>290</u> | 232 | 0 | 0 | 0.000 | 1.314 |
| Sand | 14.2 | Fresh | 0 | 292 | <u>248</u> | 0 | 147 | 313 | 0 | 0 | 0.000 | 1.480 |
| Lime | 0 | Fresh | 40 | 250 | 0 | 134 | 131 | <u>445</u> | 0 | −1 | 0.162 | 1.970 |
| Lime | 13.2 | Fresh | 47 | 314 | 0 | <u>161</u> | 149 | 328 | 0 | 0 | 0.150 | 1.802 |
| Lime | 29.3 | Fresh | 46 | 351 | 0 | 154 | 157 | 292 | 0 | −1 | 0.132 | 1.708 |
| Dolo | 11.7 | Fresh | 56 | 317 | 6 | 87 | 194 | 280 | <u>65</u> | −5 | 0.175 | 1.739 |
| Water/Mg | 100 | Fresh | 0 | 506 | 0 | 0 | 178 | 232 | <u>85</u> | 0 | 0.000 | 1.297 |

Inelastic Tool Background Differences.

Inelastic tool background, which is due to fast neutrons interacting directly with the crystal itself, can be a significant contribution to the burst spectrum. The reactions of importance are generally either inelastic scattering or epi-thermal capture. Inelastic tool background was derived consistently for the different crystal types using the 0-pu and 29-pu limestone measurements and the 100-pu water-tank measurement. The same stripping equation was used for all the standard sets:

Tool Background=0-PU Lime−1.18*29-PU Lime+ 0.18*100-PU Water

The motivation for this derivation is that fast-neutron tool background is maximized at the lowest porosities, so if the calcium, carbon, and oxygen contributions can accurately be eliminate from the 0-pu limestone measurement, the tool contribution will remain. The first subtraction of 1.18 times the 29-pu lime removes the calcium and carbon contributions, but it over subtracts oxygen, which is then added back using the water tank measurement. This result actually Spectral Contribution to the Capture Statistical Uncertainties.

Having generated complete sets of elemental standard spectra the elusive spectral contribution to the statistical uncertainties can be extracted from the diagonal element of the weighted-least-squares error matrix. This calculation implicitly accounts for the similarities and differences in the shapes of the elemental standard spectra that define the precision with which a complex spectrum can be separated into elemental contributions.

As an example, Table 6 is a representation of the WLS error matrix for the 1×1" LaCl capture analysis. The diagonal element is the spectral contribution to the statistical uncertainty of each elemental yield, with the total yield uncertainty then being equal to this diagonal element divided by the square root of the number of counts in the analysis window (assuming no background subtraction). The off-diagonal elements represent the statistical correlation between element pairs in percent.

TABLE 6

WLS error matrix for the capture analysis of LaCl.

| | chy | csi | cca | cchl | cfe | crni | cmg | calu | csul | cgd | ck | cti |
|---|---|---|---|---|---|---|---|---|---|---|---|---|
| chy | <u>1.565</u> | 40 | −17 | −9 | −3 | −12 | 27 | −4 | −8 | −64 | 19 | 17 |
| csi | 40 | <u>3.766</u> | −8 | 11 | 22 | −8 | −24 | −19 | −12 | 0 | −37 | −15 |
| cca | −17 | −8 | <u>4.146</u> | −25 | 3 | 5 | −5 | 21 | −6 | −11 | −16 | −56 |
| cchl | −9 | 11 | −25 | <u>5.171</u> | −32 | −26 | −6 | −13 | 8 | 4 | −28 | −46 |
| cfe | −3 | 22 | 3 | −32 | <u>2.837</u> | −19 | −15 | −70 | −5 | 20 | 11 | 2 |
| crni | −12 | −8 | 5 | −26 | −19 | <u>1.018</u> | −17 | 6 | −19 | 13 | 17 | 13 |
| cmg | 27 | −24 | −5 | −6 | −15 | −17 | <u>4.700</u> | −6 | 9 | −71 | 19 | 13 |

TABLE 6-continued

WLS error matrix for the capture analysis of LaCl.

| | chy | csi | cca | cchl | cfe | crni | cmg | calu | csul | cgd | ck | cti |
|---|---|---|---|---|---|---|---|---|---|---|---|---|
| calu | −4 | −19 | 21 | −13 | −70 | 6 | −6 | 4.350 | 11 | 4 | −32 | 4 |
| csul | −8 | −12 | −6 | 8 | −5 | −19 | 9 | 11 | 2.679 | 6 | −48 | 4 |
| cgd | −64 | 0 | −11 | 4 | 20 | 13 | −71 | 4 | 6 | 6.486 | −43 | 7 |
| ck | 19 | −37 | −16 | −28 | 11 | 17 | 19 | −32 | −48 | −43 | 6.852 | 21 |
| cti | 17 | −15 | −56 | −46 | 2 | 13 | 13 | 4 | 4 | 7 | 21 | 2.027 |

Table 7 shows just the diagonal elements of the WLS error matrix for the six crystals measured for this study. The calculations for LuAP were performed with and without the high-energy tail elimination—clearly the tail has a significant effect. For comparison, the same information for the 3×4" BGO detector of the ECS are included in the bottom row of the table.

Table 9 includes just the diagonal elements of the WLS error matrix for each of the 6 crystals studied here. For this analysis the lower limit was set at 1.1 MeV to pick up the prominent gamma ray from magnesium, and magnesium and sulfur were included in the analysis. For Table 10, the lower analysis limit was set to the normal 1.6 MeV and

TABLE 7

Spectral contribution to the statistical uncertainties for capture elements.

| Xtal | chy | csi | cca | cchl | cfe | crni | cmg | calu | csul | cgd | ck | cti |
|---|---|---|---|---|---|---|---|---|---|---|---|---|
| LaCl | 1.565 | 3.766 | 4.146 | 5.171 | 2.837 | 1.018 | 4.700 | 4.350 | 2.679 | 6.486 | 6.852 | 2.027 |
| LaBr | 1.424 | 3.234 | 3.605 | 4.397 | 2.494 | 0.876 | 4.146 | 3.683 | 2.580 | 6.026 | 6.349 | 1.904 |
| NaI | 1.494 | 3.517 | 3.768 | 4.917 | 3.126 | 1.001 | 4.754 | 3.426 | 3.020 | 6.372 | 6.529 | 1.830 |
| GSO | 1.564 | 5.966 | 5.327 | 8.923 | 7.172 | 1.397 | 6.561 | 9.111 | 5.020 | 8.335 | 10.548 | 3.322 |
| BGO | 1.208 | 3.278 | 3.148 | 4.849 | 3.760 | 1.019 | 4.634 | 5.250 | 3.419 | 6.185 | 7.586 | 2.087 |
| LuAP | 1.906 | 10.174 | 8.711 | 16.494 | 10.174 | 1.746 | 10.665 | 12.935 | 8.585 | 12.042 | 14.818 | 5.411 |
| No. Tail | 1.382 | 6.247 | 6.214 | 10.972 | 7.117 | 1.418 | 6.470 | 9.398 | 5.601 | 8.167 | 11.317 | 3.656 |
| ECS | 1.025 | 1.962 | 2.255 | 3.816 | 2.440 | 2.496 | 3.557 | 3.001 | 2.130 | 6.747 | 5.008 | 1.448 |

Figure 16:
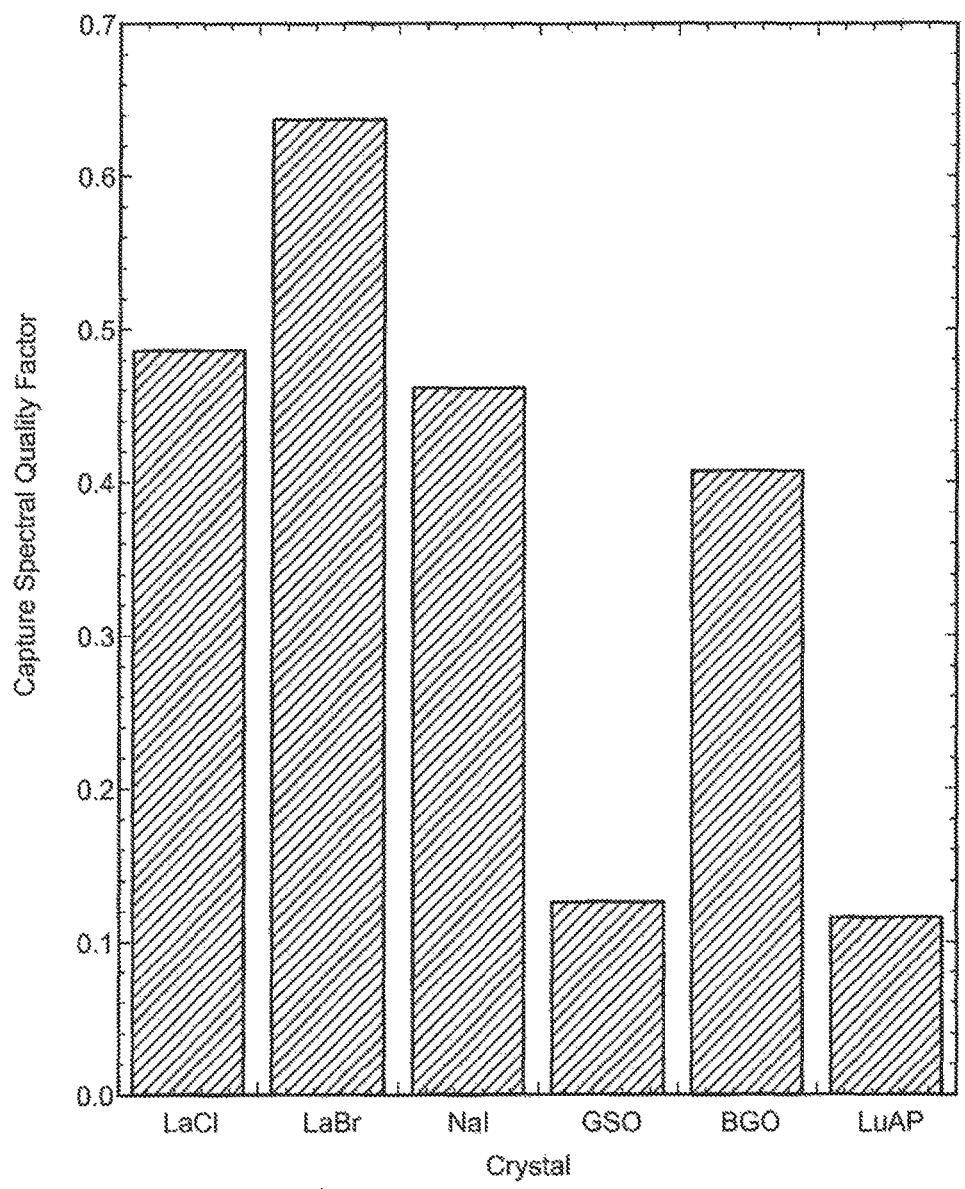
FIG. 16 is a bar chart showing capture spectral quality factors for six different crystal materials, according to some embodiments.

In order to distill the information in Table 7 into a single number for each crystal a parameter called spectral quality is defined, which scales as logging speed and is calculated from the most important elements Si, Ca, and Fe. FIG. 16 is a bar chart showing capture spectral quality factors for six different crystal materials, according to some embodiments. In chart 1610, the spectral qualify factor has been calculated relative to the 3×4" BGO detector of the ECS, for the six 1"×1" crystals. GSO and LuAP suffer notably in this comparison due to their poor resolution at high energies.

Spectral Contribution to the Inelastic Statistical Uncertainties.

Table 8 is a representation of the weighted-least-squares error matrix for the LaCl inelastic analysis. As before, the diagonal elements are the spectral contribution to the statistical uncertainty and the off diagonal elements represent the statistical correlation between element pairs in percent.

magnesium and sulfur were not included. This is the normal analysis mode for C/O logging.

TABLE 9

Spectral contribution to the statistical uncertainties for inelastic elements. Analysis limit lowered to 1.1 MeV for Mg sensitivity.

| Xtal | ic | io | isi | ica | ife | itb | img | isul |
|---|---|---|---|---|---|---|---|---|
| LaCl | 2.170 | 2.901 | 5.577 | 7.406 | 8.935 | 3.293 | 3.997 | 1.939 |
| LaBr | 2.217 | 4.146 | 3.685 | 5.997 | 7.940 | 7.714 | 3.985 | 1.751 |
| NaI | 2.226 | 3.049 | 5.931 | 8.948 | 9.605 | 8.396 | 5.202 | 2.113 |
| GSO | 2.264 | 2.529 | 4.182 | 7.349 | 7.687 | 6.167 | 3.762 | 2.124 |
| BGO | 1.758 | 2.586 | 4.073 | 5.867 | 6.399 | 5.405 | 3.165 | 1.787 |
| LuAP | 2.664 | 2.942 | 4.180 | 8.471 | 8.939 | 6.330 | 4.256 | 2.246 |
| No Tail | 2.287 | 2.652 | 3.588 | 7.186 | 7.373 | 5.509 | 3.182 | 1.936 |

TABLE 8

WLS error matrix for the inelastic analysis of LaCl.

| | ic | io | isi | ica | ife | itb | img | isul |
|---|---|---|---|---|---|---|---|---|
| ic | 2.170 | 11 | −11 | −60 | 20 | 0 | 3 | 36 |
| io | 11 | 2.901 | −12 | −19 | −21 | −12 | 5 | 56 |
| isi | −11 | −12 | 5.577 | 42 | −61 | −20 | −41 | −19 |
| ica | −60 | −19 | 42 | 7.406 | −69 | −17 | −19 | −24 |
| ife | 20 | −21 | −61 | −69 | 8.935 | 4 | −7 | −4 |
| itb | 0 | −12 | −20 | −17 | 4 | 3.293 | −2 | −40 |
| img | 3 | 5 | −41 | −19 | −7 | −2 | 3.997 | 6 |
| isul | 36 | 56 | −19 | −24 | −4 | −40 | 6 | 1.939 |

TABLE 10

Spectral contribution to the statistical uncertainties for inelastic elements. Lower analysis limit set at 1.6 MeV

| Xtal | ic | io | isi | ica | ife | itb |
|---|---|---|---|---|---|---|
| LaCl | 1.997 | 2.647 | 4.665 | 6.461 | 8.707 | 2.496 |
| LaBr | 2.025 | 3.916 | 3.089 | 5.459 | 7.432 | 7.188 |
| NaI | 1.919 | 2.653 | 4.356 | 7.526 | 8.293 | 5.849 |
| GSO | 2.189 | 2.273 | 3.701 | 5.427 | 8.828 | 8.239 |
| BGO | 1.598 | 2.248 | 3.229 | 5.104 | 7.650 | 5.988 |
| LuAP | 2.352 | 2.522 | 3.824 | 6.958 | 9.576 | 6.539 |
| No Tail | 2.078 | 2.341 | 3.112 | 6.057 | 8.175 | 5.653 |

Figure 17:
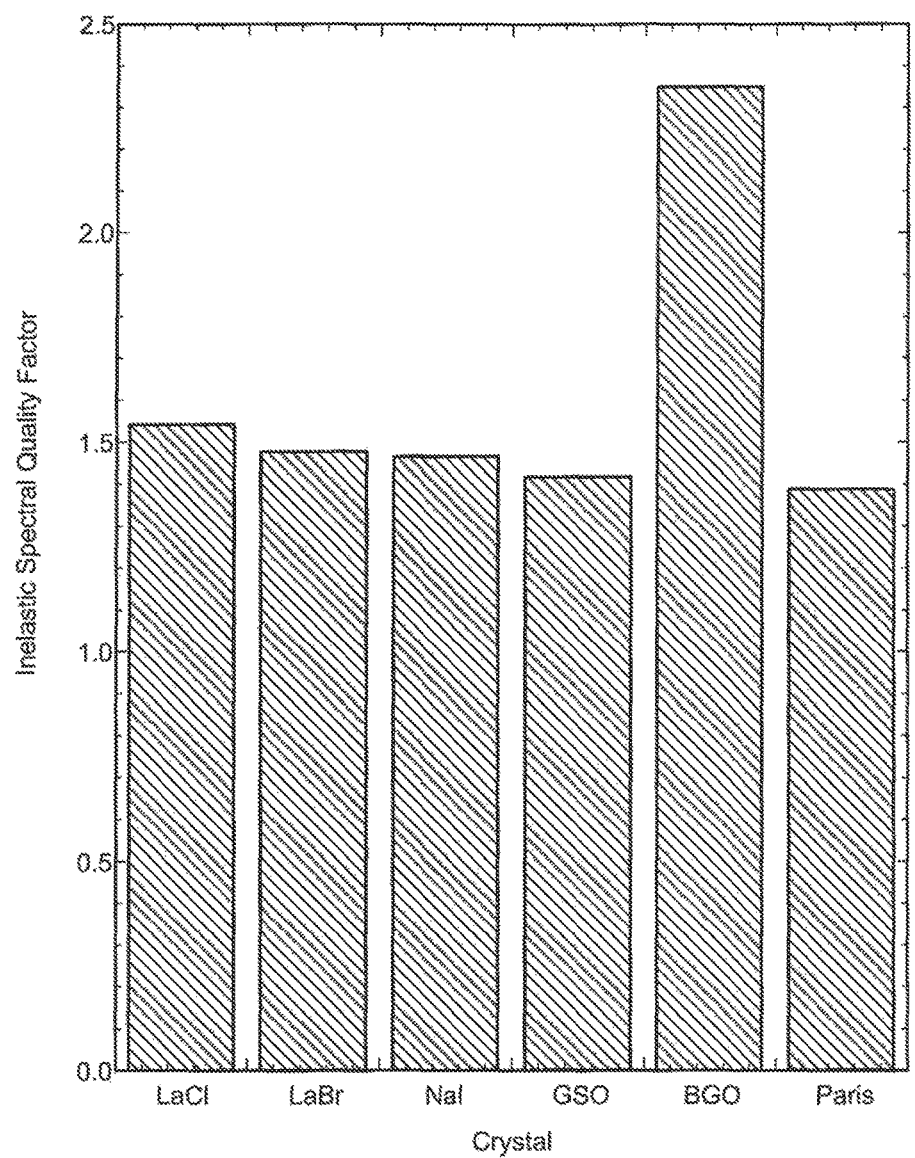
FIG. 17 is a bar chart showing the inelastic spectral quality factors relative to a GSO detector of an RST tool from Schlumberger, according to some embodiments.

FIG. 17 is a bar chart showing the inelastic spectral quality factors relative to a GSO detector of an RST tool from Schlumberger, according to some embodiments. More specifically, chart 1710 shows the inelastic spectral quality factors for the 1"×1" crystals relative to the 1"×4" GSO detector of Schlumberger's RST tool. In this case only the carbon yield is included in the quality calculation because its uncertainty dominates the bottom-line oil saturation uncertainty. It is interesting that the spectral quality for GSO and LuAP suffered greatly in the capture analysis due to the poor energy resolution of these crystal at high energy, however there is much less of a resolution effect for the inelastic analysis. In this case the poorer energy resolutions of GSO and LuAP are compensated by the better full-energy efficiencies of these materials relative to LaCl, LaBr, and NaI BGO is the clear winner here having both reasonably good high-energy resolution and good full-energy efficiency. However, note that this is just the spectral contribution to the statistical uncertainty—the significant drawbacks to BGO are that it can't count nearly as fast as the other crystals and it should be kept cool while logging.

Tool Applications.

Based on the measurements performed as described above, according to some embodiments, it is possible to make performance estimates on different potential tool configurations. For the capture measurements, these parameters are far less important. The estimates include major factors that will affect a tool measurement, including, total detector efficiency, detector high energy efficiency, detector resolution at room temperature and high temperature, variance inflation factors due to spectral shapes, dynamic ranges, and more. The detector performance is based on the performance observed in the one or two samples of detector that were available for the analysis. Therefore, some of the extrapolations/interpolations are large. As a result, it has been found that a laboratory mock-up is useful in the tool development so that the tool configuration can be properly optimized and the magnitude of the extrapolations/interpolations reduced.

FIGS. 6A-C illustrate three different C/O tool configurations based on slightly different performance criterion using a LaCl detector, according to some embodiments. Tools 610 in FIG. 6A and tool 650 in FIG. 6C are both optimized to maximize C/O logging speed and to have about the same borehole sensitivity as the Schlumberger RST-A tool. The configuration of tool 610 in FIG. 6A is for a 1¹¹⁄₁₆ inch tool while the configuration of tool 650 in FIG. 6C is for a 2½ inch tool (and assumes twice the neutron output of the smaller tool 610). C/O measurement statistics (and hence logging speed) come from both of the detectors used in tools 610 and 650; however, the far detector on tool 610 does not add that much to the overall logging speed as shown in FIG. 7 for the various configurations. Because of this, a better 1¹¹⁄₁₆ inch tool design might be configuration B where all of the C/O statistics come from the near detector, and the far detector is moved farther away to improve its gas sensitivity. All of these configurations will also provide Spectroscopy and Sigma answer products. Of course, there are many more tool variations possible depending on the tool requirement selection.

FIG. 7 shows the estimated logging speeds for both an "elemental yields" and a "windows" type interpretation. As mentioned earlier, since most of the C/O signal from tool configuration A (tool 610 of FIG. 6A) comes from the near detector, removing the far detector from the C/O measurement of tool configuration B (tool 630 of FIG. 6B) does not degrade the C/O logging speed very much. For the large tool, configuration C (tool 650 of FIG. 6C), both the near and far detectors add to the C/O logging speed; hence, tool configuration C has a much faster logging speed than the smaller tools.

Comparing the performance of a "windows type" and an "elemental yields" type of analysis shows that the "elemental yields" type of processing benefits more from the new detectors than the "windows" type of processing.

For Schlumberger's RST C/O tool, Schlumberger provides an "alpha factor" processed result that combines the precision of a windows measurement with the accuracy of the elemental yields type measurement. For water in the borehole, this provides significant perceived increased logging speed; however, for oil in the borehole, the advantages of alpha processing are less. The algorithm to combine windows and elemental yields processing is simple in concept, but quite involved when one tries to figure out how the statistics propagate through the analysis. This combination would benefit from more data for estimates than is currently available, and estimates were not made. However; it has been found that for the LaCl detector tool configurations shown, that the elemental yields processing provides better logging speeds than the windows processing. Thus, alpha processing will not improve these tool concepts. However, there might be some advantages in other tool configurations with other detector materials using the techniques and evaluation methodologies as described herein.

Figure 18:
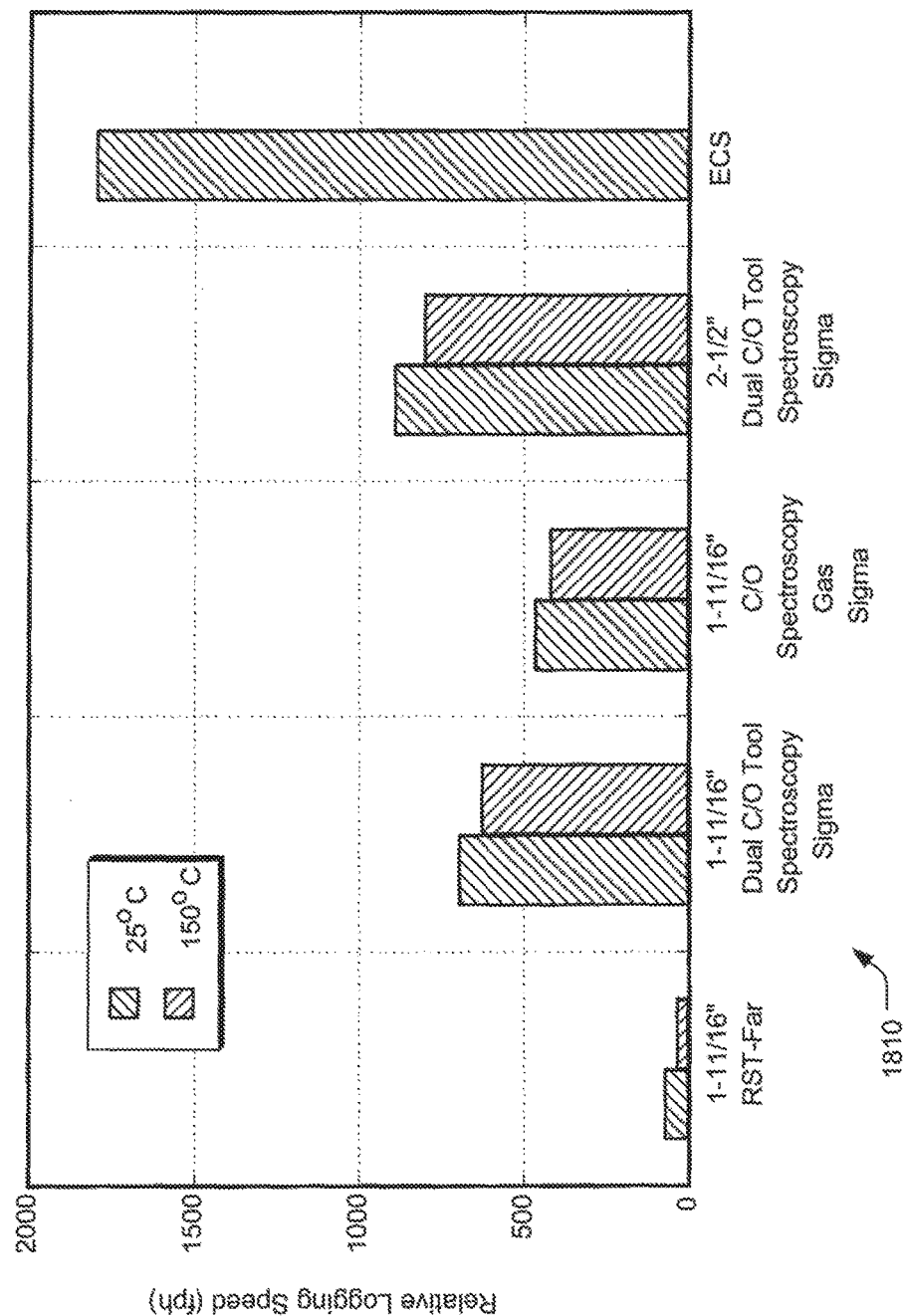
FIG. 18 is a bar chart showing the estimated capture spectroscopy logging speeds of the tool configurations shown in FIGS. 6A-C.

FIG. 18 is a bar chart showing the estimated capture spectroscopy logging speeds of the tool configurations shown in FIGS. 6A-C. For reference, the logging speeds of the RST tool and ECS tool capture measurements are shown in plot 1810. As is evident, the use of LaCl in the new tool configurations provides significant improvements in logging speed over the RST tool's GSO detectors. The data shows that if one logged with these tools for C/O data, the tools will provide capture spectroscopy results of better quality than the current ECS tool logging at 1800 fph. This means that an excellent integrated lithology/saturation log would be possible with the new tools.

Figure 19:
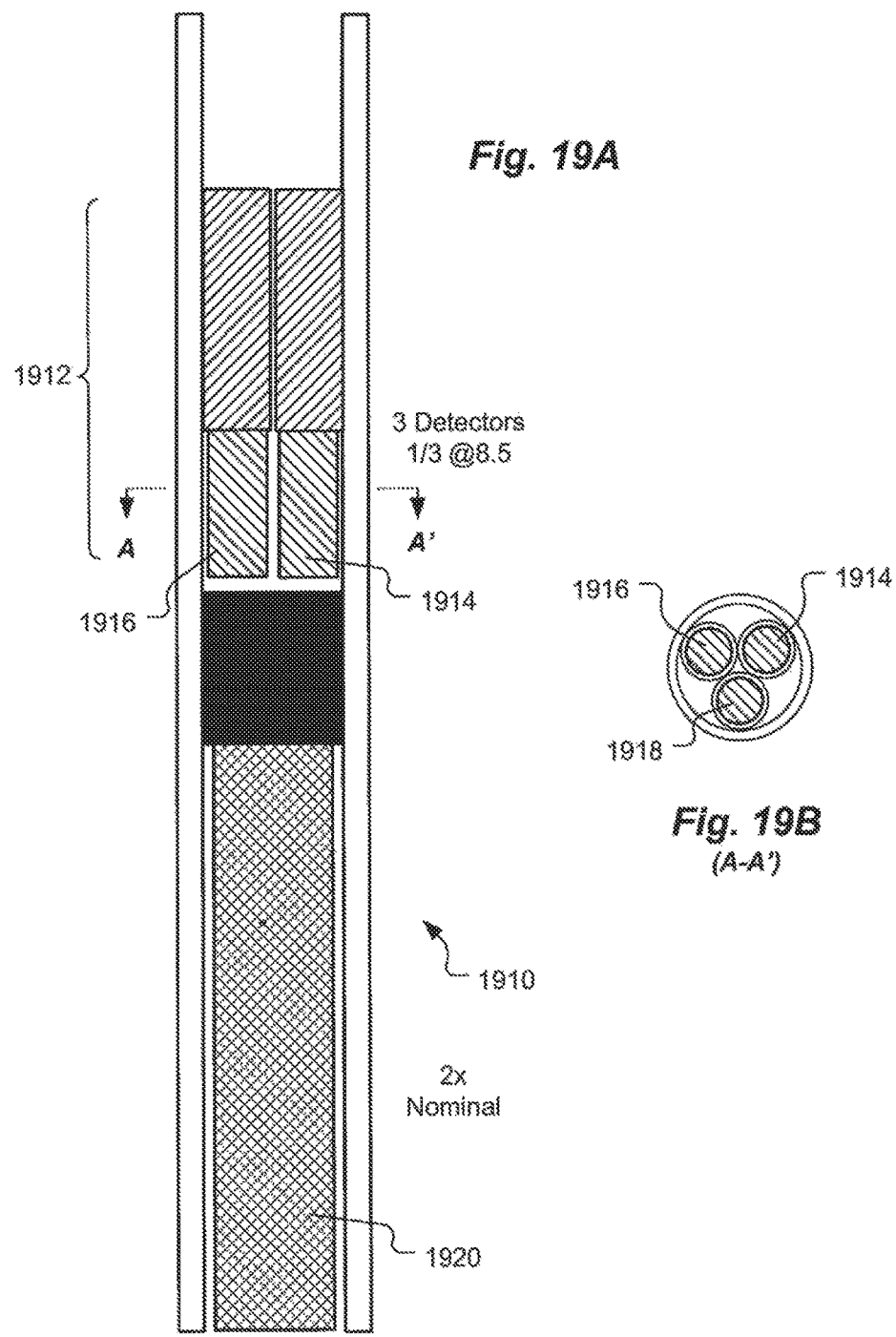
FIGS. 19A-B illustrate a capture spectroscopy tool utilizing the new lanthanum halide detectors, according to some embodiments.
Figure 20:
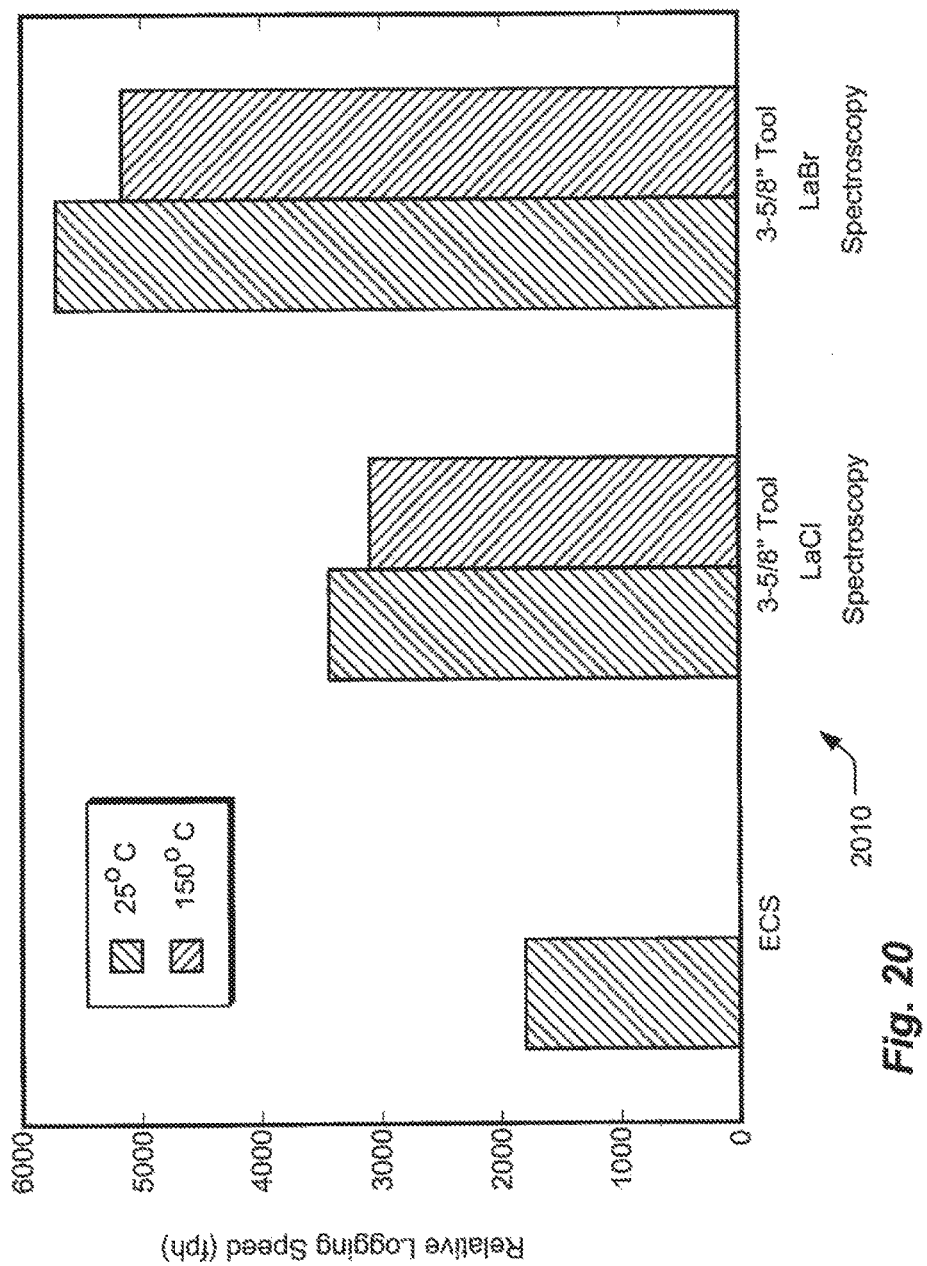
FIG. 20 is a bar chart showing the estimated logging speed of the tool configuration of FIGS. 19A-B using either LaCl or LaBr for the detectors.

FIGS. 19A-B illustrate a capture spectroscopy tool utilizing the new lanthanum halide detectors, according to some embodiments. The tool 1910 uses a large neutron generator with 1920 closely spaced detectors that are 1-inch in diameter. The detector 1912 uses three smaller diameter crystals 1914, 1916 and 1918. It has been found that using three separate small diameter crystals provides better performance than a single large diameter detector. FIG. 20 is a bar chart showing the estimated logging speed of the tool configuration of FIGS. 19A-B using either LaCl or LaBr for the detectors. The ECS is also included for a reference point. As the chart 2010 indicates, a significantly improved capture spectroscopy tool could be built with these new detector materials with LaBr providing the best performance. Even though this is shown as improvements in logging speed in chart 2010, the improvements can be translated to improved precision at the lower ECS logging speed. This improves the statistical precision of additional elements, such as Al and Mg. This could have significant impact in some applications, such as in carbonates. Furthermore, major advantages in tool design and operating logistics could be realized due to the excellent high temperature performance of the new halide detectors compared to the current ECS. The present ECS has a Dewar flask and requires pre-cooling of the BGO detector before logging. Neither a Dewar nor pre-cooling would be required for the new halide detectors.

Further detail of embodiments generally relating to the use of La-halide detectors for the capture gamma-ray spectroscopy measurement will now be provided. Experiments have been carried out evaluating various detectors for the capture spectroscopy measurement with regard to optimizing the measurement for precision (or logging speed) which, at the same time, optimizes the response for the most statistically significant number of elemental yields. A number of factors and their effect on the logging speed (precision) have been analyzed.

(Rel. Logging Speed)~(Rel. Spectral Quality)*(Rel. Efficiency)*(Rel. Max Counting Rate)

Where: Spectral Quality (preferably a higher value) is a measure of the ability to separate, by the least-squares process, different elements in a statistical manner and includes many detector properties, e.g., light output, atomic number, temperature response, peak-to-Compton, size, and resolution; Efficiency (preferably a higher value) is a measure of the fraction of high-energy gamma-rays absorbed that pass through the detector and are therefore detected and is related to the detector size, density, and atomic number; and Max Counting Rate (preferably a higher value) is a measure of how fast the detector is able to detect and process individual gamma-rays that are absorbed in the detector and is based on the light production and decay properties of the detector.

Table 11 shows how these properties vary for several detectors (having the same size) of various types. The last two columns of Table 11 give the relative logging speed (preferably a higher value) for the detector (assuming everything else is the same) and also assuming that the measurement is either neutron limited or not, i.e., if you can produce enough neutrons to push the detector to the limit. In optimizing a tool, the detector position would also be adjusted relative to the source optimizing the count-rate versus the degradation in formation response. Therefore, the optimum tool design would have a relative logging speed somewhere between the values in the two columns. Note, the spectral quality factor and efficiency will change as detector size changes, thus affecting the values in the last two columns.

TABLE 11

| Detector | Relative Spectral Quality | Relative High-Energy Efficiency | Relative Max Countrate | Relative Logging Speed (no neutron limit) | Relative Logging Speed (neutron limited) |
|---|---|---|---|---|---|
| LaCl | 0.38 | 0.39 | 11.5 | 10.7 | 0.93 |
| LaBr | 0.515 | 0.48 | 6.6 | 9.7 | 1.5 |
| NaI | 0.400 | 0.40 | 1.0 | 1.0 | 1.0 |
| GSO | 0.128 | 0.72 | 3.9 | 1.7 | 0.6 |
| BGO | 0.303 | 0.78 | 0.77 | 0.8 | 1.5 |
| LuAP | 0.112 | 0.96 | 13.6 | 5.7 | 0.7 |
| LuAG | 0.49 | 0.75 | 6.6 | 10.9 | 2.3 |

Based on this type of analysis and real tool constraints as far as detector size, position, current quality of detectors, and detector types; the La-halide detectors have been found to be superior for the capture spectroscopy measurement in many applications. Chart 2010 in FIG. 20 shows a comparison of predicted tool performance at elevated and room temperature using different detectors in a capture spectroscopy tool configuration. The current state of the art tool, ECS, uses a BGO detector that will not work at elevated temperature (and therefore must be put in a Dewar), its performance is only shown for room temperature. As can be seen, the performance using La-halide detectors is significantly improved over that of the ECS with about a factor of two improvement in logging speed for LaCl3 and over a factor of three improvement for LaBr3. This is true even if the detector is used at high temperature. A further advantage to the above embodiment is that the detector does not have to be put in a Dewar.

Further details of embodiments relating generally to downhole density measurements will now be provided. Currently, NaI is the detector of choice for downhole density applications because of its good high temperature capabilities, low cost, and reasonable performance. According to some embodiments, a method to identify detectors that will allow the faster counting of gamma-ray pulses for downhole applications is provided. For this application, one important detector characteristic is the detector decay time, which is shown in Table 12 for several different detectors.

To first order, the countrate capability of the detector is directly proportional to the decay time, the faster the decay time, the better. It has been found that a decay time of less than about 100 ns is suitable for some applications, according to some embodiments. For example, LaCl, with a 20 ns decay time, can count 11.5 times faster than NaI with a decay time of 230 ns. If everything else was equal and there was no source output limit, this would mean that a tool with LaCl could log at 11.5 times the logging speed of a tool with NaI. In practice, everything else is not equal in these evaluations, hence the quantitative evaluation is preferably done looking at other factors.

TABLE 12

Summary of Detector Characteristics for some new Scintillators

| Material | Density (g/cc) | $P_e$ | % Relative Light Output | Decay Time (ns) | Cs FWHM (%) |
|---|---|---|---|---|---|
| NaI | 3.67 | 336 | 100 | 230 | 6.5 |
| BGO | 7.13 | 1302 | 5.7 | 300 | 12.7 |
| GSO (0.5%) | 6.71 | 430 | 22 | 60 | 8.1 |
| GSO (1.5%) | 6.71 | 430 | 20 | 38 | 8.1 |
| GSO-Z | ~6.7 | 430 | 22 | 30 | 8.0 |
| LuAP | 8.30 | 763 | 12 | 17 | 14.9 |
| LaCl3 | 3.64 | 281 | 64 | 20 | 4.8 |
| LaBr3 | 5.30 | 244 | 122 | 35 | 3.6 |
| La(Br,Cl)3 | ~4.5 | ~260 | ~150 | ~25 | ~3.8 |
| LuAG:Pr | 6.7 | | 44 | 20 | 12 |

Based on these arguments, the instantaneous countrates for a new generation tool are advantageously at least 4 to 6 times higher than that of existing tools. Therefore, any of the last 5 entries in Table 1 would be good candidate detectors for this measurement.

It should be noted that for the PeX, the near spaced, back-scatter detector in the density sub had too high a countrate for the measurement. Because of this, GSO (1.5%) in the table was developed that had a faster decay time than regular GSO.

These fast detectors can also be applied to improvements in accelerator measurements producing neutrons in the following applications by reducing countrate losses, minimizing spectral distortion, and allowing more detected counts, assuming neutron output can be increased: (1) Sigma Measurement; (2) Inelastic Spectroscopy Measurements; and (3) Capture Spectroscopy Measurements.

Figure 3:
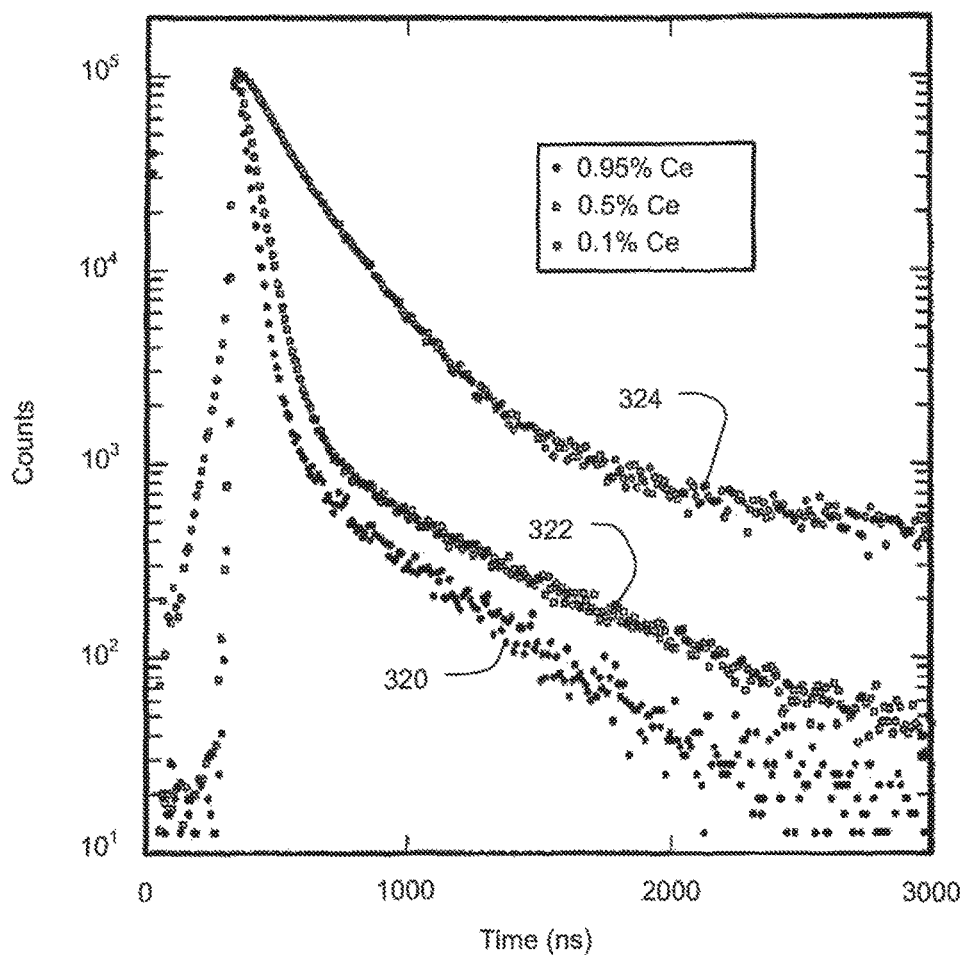
FIG. 3 is a plot illustrating how the decay time of LaCl can be modified by adjusting the concentration of Ce in the matrix, according to some embodiments.

FIG. 3 is a plot illustrating how the decay time of LaCl can be modified by adjusting the concentration of Ce in the matrix. As the plot shows, curve 324 with the lowest Ce concentration has the slowest decay as indicated by the longer time required for the light signal to diminish. As the concentration of Ce is increased, the decay rate increases on curves 322 and 320. The faster decay means that the detector is "reset" or ready to receive a new pulse earlier than with the lower concentration. As a result, this allows the detector to count faster, or process more counts per second.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the disclosure has been described with reference to particular preferred embodiments, but variations within the spirit and scope of the disclosure will occur to those skilled in the art. It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A system for detecting gamma-rays downhole comprising:
   a tool housing adapted and dimensioned to be deployed in a borehole within a subterranean formation; and
   a scintillator material mounted within the tool housing and emitting light when gamma-rays are absorbed, and the scintillator material having an associated decay time of less than about 40 ns.

2. The system according to claim 1, wherein the scintillator material is selected from a group consisting of: GSO-Z, LuAP, $LaCl_3$, $LaBr_3$, $La(Br,Cl)_3$, YAP, and LuAG.

3. The system according to claim 1 further comprising a photodetector mounted within the tool housing and adapted so as to detect light emitted by the scintillator material.

4. The system according to claim 1, wherein the system is adapted to detect gamma-rays primarily produced by neutron inelastic scattering.

5. The system according to claim 1, wherein the system is adapted to detect gamma-rays primarily produced by neutron capture events.

6. The system according to claim 1, wherein the system is adapted to detect x-rays or gamma-rays scattered by the subterranean formation.

7. The system according to claim 1, wherein the system is adapted to detect gamma-rays primarily produced by inelastic scattering and minimize the sensitivity to epithermal neutrons.

8. The system according to claim 1, further comprising a nuclear source mounted within the tool housing and adapted so as to emit nuclear radiation into the subterranean formation.

9. The system according to claim 8, wherein the nuclear source includes a neutron source adapted to emit neutrons into the subterranean formation so as to produce gamma-rays.

10. The system according to claim 8, wherein the nuclear source is an x-ray source adapted to emit x-rays into the subterranean formation.

11. The system according to claim 10, wherein the x-ray source is an accelerator-based x-ray source.

12. A downhole tool comprising:
    a tool housing adapted and dimensioned to be deployed in a borehole within a subterranean formation;
    an x-ray or gamma ray source mounted within the tool housing and adapted so as to emit x-rays or gamma rays into the subterranean formation; and
    a scintillator material mounted within the tool housing, and emitting light when x-rays or gamma rays are absorbed, the scintillator material being selected from a group consisting of: GSO-Z, LuAP, $LaCl_3$, $LaBr_3$, $La(Br,Cl)_3$ and LuAG.

13. The downhole tool according to claim 12, wherein the scintillator material has an associated decay time that is short enough to allow for processing of x-ray or gamma ray counts having reduced losses and distortion.

14. The downhole tool according to claim 13, wherein the associated decay time is less than about 100 ns.

15. The downhole tool according to claim 13, wherein the associated decay time is less than about 40 ns.

16. The downhole tool according to claim 12, wherein the x-ray source is an accelerator-based x-ray source.

17. The downhole tool according to claim 12, wherein the gamma ray source is a radioactive gamma ray source.

18. A method comprising:
    deploying a tool in a borehole within a subterranean formation; and
    detecting gamma-rays using a scintillator material and a photodetector mounted within the tool, and the scintillator material having an associated decay time of less than about 40 ns, the scintillator material emitting light when gamma-rays are absorbed, and the photodetector detecting light emitted by the scintillator material, and
    determining one or more properties of the subterranean formation based at least in part on the detected gamma-rays.

19. The method according to claim 18, wherein the scintillator material is primarily of a type selected from the group consisting of: $LaCl_3$, $LaBr_3$, $La(Br,Cl)_3$, YAP, and LuAG.

20. The method according to claim 18, wherein the one or more properties of the subterranean formation comprise elemental yields.

* * * * *